US010569213B2

(12) United States Patent
Thompson et al.

(10) Patent No.: US 10,569,213 B2
(45) Date of Patent: Feb. 25, 2020

(54) REMOVAL OF ACID GAS FROM A FEED GAS STREAM USING SMALL PORE ZEOLITES CONTAINING DOUBLE-SIX RINGS AND CAGES

(71) Applicant: Chevron U.S.A. Inc., San Ramon, CA (US)

(72) Inventors: Joshua Allen Thompson, Fairfield, CA (US); Dan Xie, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 223 days.

(21) Appl. No.: 15/883,406

(22) Filed: Jan. 30, 2018

(65) Prior Publication Data

US 2018/0257019 A1   Sep. 13, 2018

Related U.S. Application Data

(60) Provisional application No. 62/468,513, filed on Mar. 8, 2017.

(51) Int. Cl.
*B01D 53/047* (2006.01)
*B01J 20/18* (2006.01)
(Continued)

(52) U.S. Cl.
CPC .............. *B01D 53/02* (2013.01); *B01J 29/50* (2013.01); *B01J 29/70* (2013.01); *B01J 29/80* (2013.01);
(Continued)

(58) Field of Classification Search
CPC ...... B01D 53/02; B01D 53/04; B01D 53/047; B01D 2253/108; B01D 2253/1085;
(Continued)

(56) References Cited

U.S. PATENT DOCUMENTS 4,544,538 A   10/1985  Zones
4,925,460 A    5/1990  Coe et al.
(Continued)

FOREIGN PATENT DOCUMENTS

WO   2014092870 A1   6/2014
WO   2016003504 A1   1/2016
(Continued)

OTHER PUBLICATIONS

Y. Wang, M. D. LeVan, "Adsorption Equilibrium of Binary Mixtures of Carbon Dioxide and Water Vapor on Zeolites 5A and 13X", J. Chem. Eng. Data, J. Chem. Eng. Data, 2010, 55, 3189-3195.
(Continued)

*Primary Examiner* — Frank M Lawrence, Jr.
(74) *Attorney, Agent, or Firm* — Susan M. Abernathy; Howard V. Owens

(57) ABSTRACT

A method for removing acid gas from feed gas, comprising: alternating input of feed gas between beds of adsorbent particles that comprise zeolite SSZ-98 or SSZ-105; wherein gas contacts one of the beds during an adsorption and tail gas is vented from another bed by desorption; wherein a product gas containing no greater than about 2 Mol % carbon dioxide is produced, and methane and ethane are recovered. A method for removing acid gas, wherein the product gas contains 1 wppm $H_2S$ or less. A process for removing acid gas from feed gas, comprising adjusting selectivity of an adsorbent by changing a substitution of ERI phase with LEV phase in an intergrown molecular sieve. A process for removing acid gas from a feed gas, comprising: contacting a feed gas with adsorbent comprising a molecular sieve having a defined intergrowth of an ERI phase and a LEV phase.

27 Claims, 17 Drawing Sheets

(51) Int. Cl.
*B01D 53/02* (2006.01)
*B01J 29/50* (2006.01)
*B01J 29/70* (2006.01)
*B01J 29/80* (2006.01)
*C10G 25/03* (2006.01)

(52) U.S. Cl.
CPC ........ *C10G 25/03* (2013.01); *B01D 2253/108* (2013.01); *B01D 2257/304* (2013.01); *B01D 2257/306* (2013.01); *B01D 2257/40* (2013.01); *B01D 2257/504* (2013.01); *C10G 2300/1081* (2013.01); *C10G 2300/207* (2013.01)

(58) Field of Classification Search
CPC .......... B01D 2256/24; B01D 2256/245; B01D 2257/304; B01D 2257/306; B01D 2257/308; B01D 2257/40; B01D 2257/504; B01D 2259/404; B01D 2259/40039; B01J 20/18; B01J 29/50; B01J 29/70; B01J 29/80; C10G 25/03; C10G 2300/1081; C10G 2300/207; C10L 3/102; C10L 3/103; C10L 3/104; C10L 2290/542; Y02C 10/08
USPC ................................. 95/96–98, 103, 136, 139
See application file for complete search history.

(56) References Cited

U.S. PATENT DOCUMENTS

| | | | |
|---|---|---|---|
| 5,939,044 A | 8/1999 | Nakagawa et al. | |
| 5,958,370 A | 9/1999 | Zones et al. | |
| 6,033,643 A | 3/2000 | Yuen et al. | |
| 6,068,682 A | 5/2000 | Kuznicki et al. | |
| 6,488,741 B2 | 12/2002 | Olson | |
| 6,497,750 B2 | 12/2002 | Butwell et al. | |
| 6,709,644 B2 | 3/2004 | Zones et al. | |
| 8,926,735 B1 | 1/2015 | Xie et al. | |
| 9,409,786 B2 | 8/2016 | Xie et al. | |
| 9,416,017 B2 | 8/2016 | Xie et al. | |
| 10,092,875 B2 * | 10/2018 | Thompson | B01D 53/053 |
| 10,272,423 B2 * | 4/2019 | Xie | B01J 29/80 |
| 2014/0174291 A1 | 6/2014 | Gupta et al. | |
| 2016/0175759 A1 | 6/2016 | Carstensen et al. | |
| 2016/0375428 A1 | 12/2016 | Xie et al. | |

FOREIGN PATENT DOCUMENTS

WO 2016094784 A1 6/2016
WO 2017065967 A1 4/2017

OTHER PUBLICATIONS

Hudson et al., National Institute of Standards and Technology, "Unconventional, Highly Selective $CO_2$ Adsorption in Zeolite SSZ-13", Journal of the American Chemical Society, 2012, vol. 134, p., Journal of the American Chemical Society, 2012, vol. 134, p. 1970-1973.

M. Luberti, D. Friedrich, S. Brandani, H. Ahn, "Design of a H2 PSA for Cogeneration of Ultrapure Hydrogen and Power at an Advanced Integrated Gasification Combined Cycle with Pre-combustion Capture", Adsorption, 2014, 20, 511-524. http://rd.spri, Adsorption, 2014, 20, 511-524.

PCT/IB2018/050571 International Search Report and Written Opinion.

* cited by examiner

REMOVAL OF ACID GAS FROM A FEED GAS STREAM USING SMALL PORE ZEOLITES CONTAINING DOUBLE-SIX RINGS AND CAGES

TECHNICAL FIELD

This application is directed to methods for removing acid gas from a feed gas stream, that comprises the acid gas, methane, and ethane, using zeolite SSZ-98, zeolite SSZ-105, or other zeolite intergrowths of an ERI phase and a LEV phase.

BACKGROUND

Improved methods, processes, and equipment are needed for removing contaminants from gas. Natural gas can contain significant levels of contaminants, such as water, carbonyl sulfide, hydrogen sulfide, carbon dioxide, nitrogen, and mercaptans. Synthesis gas can contain significant levels of contaminants, such as carbon dioxide, hydrogen sulfide, water, nitrogen, ammonia, oxides of nitrogen, and oxides of sulfur. It is desired to remove one or more of these contaminants from the feed gas stream and selectively retain the hydrocarbons, such as methane, ethane, and propane in a product gas stream.

It is desired to have a pressure swing adsorption process that uses alternative adsorbent materials that produce a product gas stream containing low amounts of carbon dioxide, while also retaining significant amounts of the methane and ethane from the feed gas stream.

SUMMARY

This application provides a method for removing an acid gas from a feed gas stream that includes the acid gas, a methane and an ethane, comprising:

alternating an input of the feed gas stream between an at least two beds of a one or more adsorbent particles made from a homogeneous mixture, wherein the one or more adsorbent particles comprise a zeolite SSZ-98 or a zeolite SSZ-105;

wherein the feed gas stream contacts one of the at least two beds at a given time by an adsorption step and a tail gas stream is simultaneously vented from another of the at least two beds by a desorption step;

wherein a contacting in the one of the at least two beds occurs at a feed pressure of from about 345 kPa to about 6895 kPa for a sufficient time to preferentially adsorb the acid gas from the feed gas stream and thereby producing a product gas stream containing no greater than about 2 Mol % carbon dioxide, at least about 65 Mol % of the methane recovered from the feed gas stream, and at least about 25 Mol % of the ethane recovered from the feed gas stream; and wherein the feed gas stream is input at a feed end of each of the at least two beds, the product gas stream is removed from a product end of each of the at least two beds, and the tail gas stream is vented from the feed end of the at least two beds.

This application also provides a method for removing an acid gas from a feed gas stream, wherein the feed gas stream includes a methane, an ethane, a carbon dioxide, and from 4 to 1000 wppm hydrogen sulfide, comprising:

alternating an input of the feed gas stream between an at least two beds of a one or more adsorbent particles made from a homogeneous mixture, wherein the one or more adsorbent particles comprise a zeolite SSZ-98 or a zeolite SSZ-105;

wherein the feed gas stream contacts one of the at least two beds at a given time in an adsorption step and a tail gas stream is simultaneously vented from another of the at least two beds in a desorption step;

wherein a contacting in the one of the at least two beds occurs at a feed pressure of from about 345 kPa to about 6895 kPa for a sufficient time to preferentially adsorb the acid gas from the feed gas stream; thereby producing a product gas stream containing no greater than about 2 Mol % of the carbon dioxide, no greater than about 1 wppm of a carbonyl sulfide, no greater than about 1 wppm of the hydrogen sulfide, at least about 65 Mol % of the methane recovered from the feed gas stream, and at least about 25 Mol % of the ethane recovered from the feed gas stream; and wherein the feed gas stream is input at a feed end of each of the at least two beds, the product gas stream is removed from a product end of each of the at least two beds, and the tail gas stream is vented from the feed end of the at least two beds.

This application also provides a process for removing an acid gas from a feed gas stream, comprising: adjusting a selectivity of an adsorbent for retaining an ethane or a propane in a product gas stream by changing a substitution of an ERI phase with a LEV phase in a molecular sieve having an intergrowth of the ERI phase and the LEV phase; and contacting the adsorbent that comprises the molecular sieve with the feed gas stream.

This application also provides a process for removing an acid gas from a feed gas stream, comprising:

contacting a feed gas stream with adsorbent particles comprising a molecular sieve having an intergrowth of an ERI phase and a LEV phase to provide a product gas stream with less than 2 Mol % $CO_2$, from 80 to 99 Mol % of a methane recovered from the feed gas stream, from 40 to 99 Mol % of an ethane recovered from the feed gas stream, and from 60 to 100 Mol % of a propane recovered from the feed gas stream; wherein the LEV phase is from 31 to 99% in the molecular sieve.

The present invention may suitably comprise, consist of, or consist essentially of, the elements in the claims, as described herein.

GLOSSARY

Figure 1:
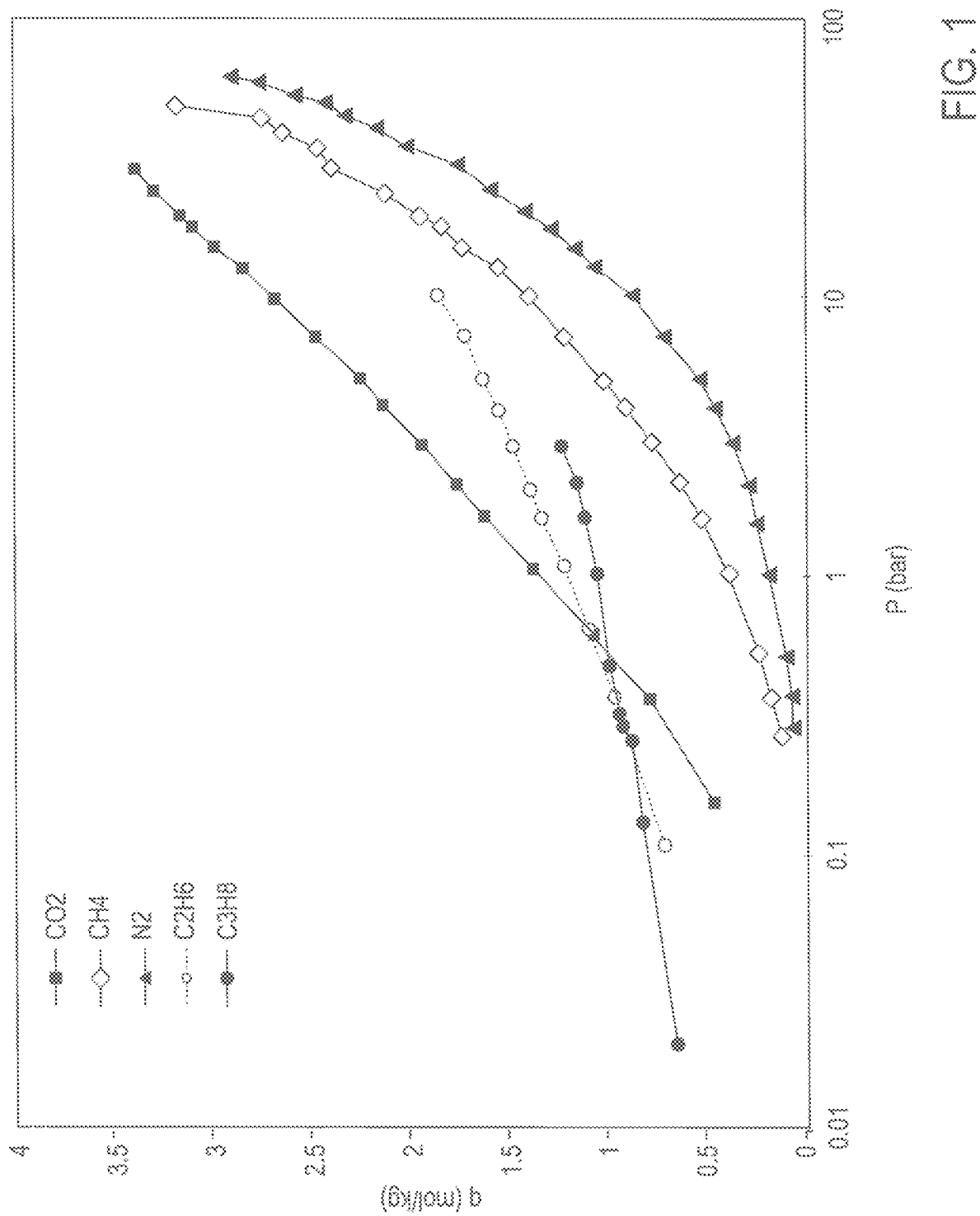
FIG. 1 is a plot of the equilibrium adsorption results for $CO_2$, $C_2H_6$, $CH_4$, $N_2$, and $C_3H_8$, on H-SSZ-98-A at 30° C.
Figure 2:
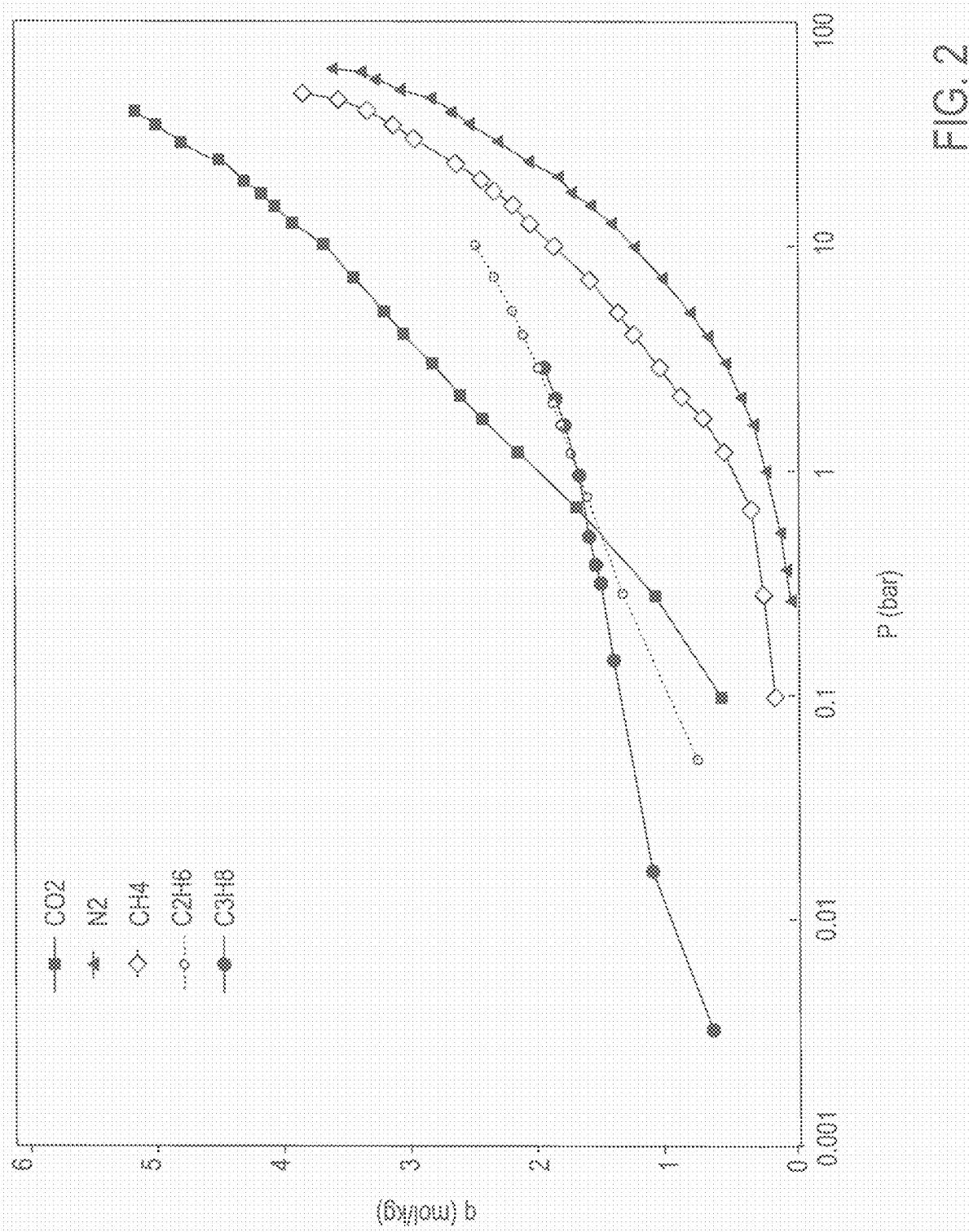
FIG. 2 is a plot of the equilibrium adsorption results for $CO_2$, $C_2H_6$, $CH_4$, $N_2$, and $C_3H_8$ on H-SSZ-98-B at 30° C.
Figure 3:
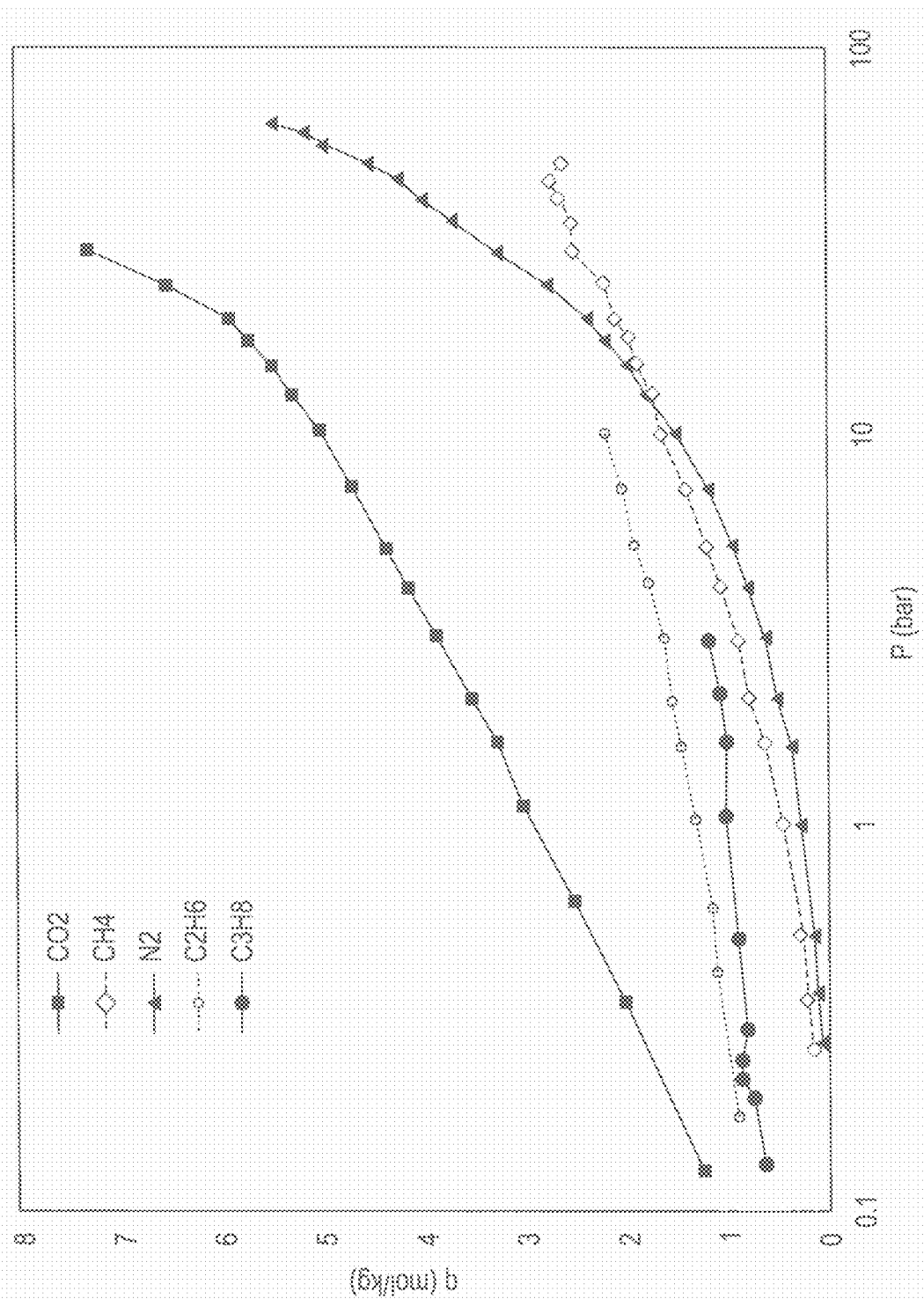
FIG. 3 is a plot of the equilibrium adsorption results for $CO_2$, $C_2H_6$, $CH_4$, $N_2$, and $C_3H_8$ on Na-SSZ-98-A at 30° C.
Figure 4:
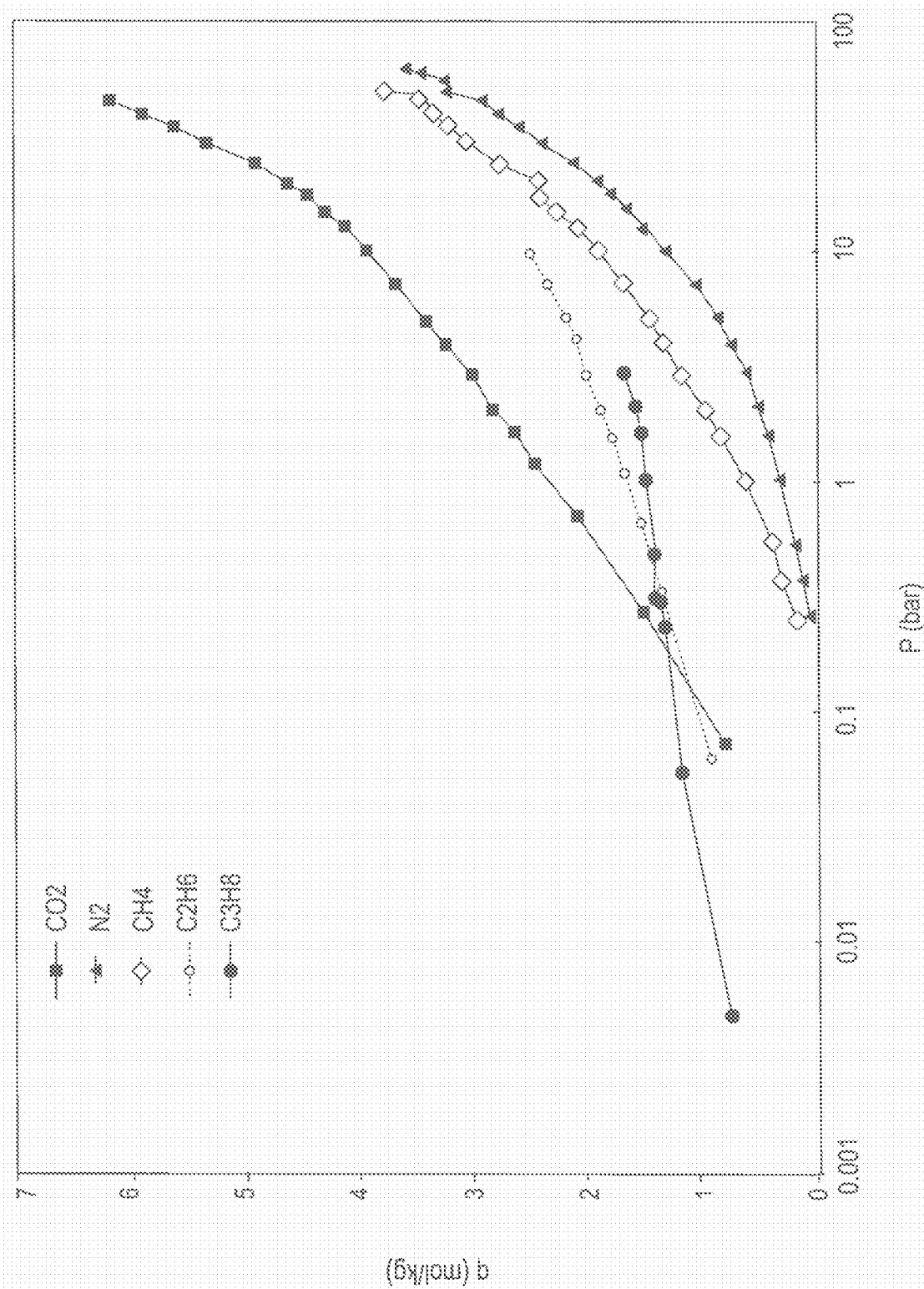
FIG. 4 is a plot of the equilibrium adsorption results for $CO_2$, $C_2H_6$, $CH_4$, $N_2$, and $C_3H_8$ on Na-SSZ-98-B at 30° C.

A "natural gas" is a gas that is comprised primarily of methane, and which when properly processed can be used as fuel by residential, commercial, or industrial consumers.

A "synthesis gas" is a gas that contains at least carbon monoxide and hydrogen. Other molecular components in synthesis gas can include methane, ethane, carbon dioxide, hydrogen sulfide, water, nitrogen, ammonia, oxides of nitrogen, and oxides of sulfur.

"Acid gas" refers to acid forming gaseous contaminants that can be found in natural gas or synthesis gas. These gaseous contaminants include one or more of carbon dioxide, hydrogen sulfide, carbonyl sulfide, oxides of nitrogen, and oxides of sulfur.

"Carbonyl sulfide" is the organic compound with the atomic formula OCS. Commonly written as COS, it is a colorless flammable gas with an unpleasant odor. It is a linear molecule consisting of a carbonyl group double bonded to a sulfur atom. Carbonyl sulfide can be considered to be intermediate between carbon dioxide and carbon disulfide, both of which are valence isoelectronic with it.

"Framework type" is used in the sense described in the "Atlas of Zeolite Framework Types," Sixth Revised Edition, Elsevier (2007).

"Million standard cubic feet" (MMSCF) and "Million standard cubic feet per day" (MMSCFD) are units of measurement for gases that are predominantly used in the United States. A related unit of measure to MMSCFD is "mega standard cubic meters per day" (MSm$^3$/d), which is equal to 106 Sm$^3$/d used in many countries outside the United States. One MMSCFD equals 1180 Sm$^3$/h.

"Block valve" refers to a valve that can prevent motion or allow motion to happen without restriction. This means that the valve must have no effect on movement in the off position and totally block movement in the on position. The most common type of block valve is the simple gate valve although there are hundreds of different variations.

DETAILED DESCRIPTION

In one embodiment, methods and processes of the present disclosure use alternative adsorbent particles that comprise a zeolite SSZ-98 or a zeolite SSZ-105 to remove the contaminants from a feed gas stream. Zeolites are crystalline solids structures made of silicon, aluminum and oxygen that form a framework with cavities and channels inside where cations, water and/or small molecules may reside. Zeolites are crystalline aluminosilicates with open 3D framework structures built of $SiO_4$ and $AlO_4$ tetrahedra linked to each other by sharing all the oxygen atoms to form regular intra-crystalline cavities and channels of molecular dimensions. A defining feature of zeolites is that their frameworks are made up of 4-coordinated atoms forming tetrahedra. These tetrahedra are linked together by their corners and make a rich variety of beautiful structures. The framework structure may contain linked cages, cavities or channels, which are big enough to allow small molecules to enter. The system of large voids explains the consistent low specific density of these compounds. The aluminosilicate framework is negatively charged and can attract positive cations that reside in the cages as a framework ion and can compensate for the negative charge of the framework.

In one embodiment, the process for removing an acid gas from a feed gas stream comprises adjusting a selectivity of an adsorbent for retaining an ethane or a propane in a product gas stream by changing the substitution of an ERI phase with a LEV phase in a molecular sieve, or zeolite, having an intergrowth of the ERI phase and the LEV phase.

Zeolite SSZ-98 is an example of a synthetic zeolite with an ERI framework type. Molecular sieves are classified by the Structure Commission of the International Zeolite Association (IZA) according to the rules of the IUPAC Commission on Zeolite Nomenclature. According to this classification, framework type zeolites and other crystalline microporous molecular sieves, for which a structure has been established, are assigned a three letter code and are described in the "Atlas of Zeolite Framework Types," Sixth Revised Edition, Elsevier (2007).

ERI framework type molecular sieves, or zeolites, are characterized by three-dimensional 8-membered-ring pore/channel systems containing double-six-rings (d6R) and cages. Zeolite SSZ-98 is a small pore zeolite containing d6R building units and cages.

U.S. Pat. Nos. 9,409,786 and 9,416,017 disclose an ERI framework type molecular sieve designated zeolite SSZ-98 and its synthesis using N,N'-dimethyl-1,4-diazabicyclo [2.2.2]octane dications as a structure directing agent. Zeolite SSZ-98 can also be synthesized using a structure directing agent selected from trimethylphenylammoniun cations, cationic 1,4-diazobicyclo[2.2.2]octane, and combinations thereof. Alternative synthesis methods to make zeolite SSZ-98 are described in U.S. Patent Application Publication No. 2016/0375428.

Zeolite SSZ-105 is an example of a synthetic molecular sieve, or zeolite, that comprises at least one intergrown phase of an ERI framework type molecular sieve and a LEV framework type molecular sieve. Zeolite SSZ-105 can also be described as a molecular sieve having an intergrowth of an ERI phase and a LEV phase. LEV framework-type molecular sieves are also characterized by three-dimensional 8-membered-ring pore/channel systems containing double-six-rings (d6R) and cages. Zeolite SSZ-105 has disordered planar intergrowths of end-member structures ERI and LEV. Zeolite SSZ-105 comprises regions of the ERI framework type sequences and regions of the LEV framework type sequences. Each change from an ERI to an LEV framework type sequence in the zeolite SSZ-105 results in a stacking fault. Any structure directing agent that can make the zeolite SSZ-105 can be used. For example, US20170106357A1 discloses methods to prepare, and compositions of, zeolite SSZ-105 using an N,N-dimethylpiperidinium cation as the structure directing agent.

In one embodiment, the zeolite SSZ-98, the zeolite SSZ-105, or the molecular sieve having an intergrowth of an ERI phase and a LEV phase, has a Si:Al mole ratio of 5 or greater, such as from 5 to 100. In one embodiment, the Si:Al mole ratio can be from greater than 5 to 80, such as from 10 to 50, or from 10 to 35. The Si:Al mole ratio is determined by inductively coupled plasma (ICP) elemental analysis.

In one embodiment the zeolite SSZ-98, the zeolite SSZ-105, or the molecular sieve having an intergrowth of an ERI phase and a LEV phase, is formed into the adsorbent particles by pressing into pellets. In one embodiment, the adsorbent particles can be a component in a membrane that is used for removing the acid gas from the feed gas stream. Some examples of mixed-matrix membranes with dispersed adsorbent particles are described in U.S. Pat. No. 6,508,860.

In one embodiment, the zeolite SSZ-98, the zeolite SSZ-105, or the molecular sieve having an intergrowth of an ERI phase and a LEV phase, can be formulated into the adsorbent particles using a combination with other materials, such as binders and/or matrix materials, which provide additional hardness or adsorbent activity to the adsorbent particles. When used, the relative proportions of the zeolite SSZ-98, the zeolite SSZ-105, or the molecular sieve having an intergrowth of an ERI phase and LEV phase, and other materials may vary widely with the zeolite or molecular sieve content ranging from 1 to 90 wt %, or from 2 to 80 wt % of the adsorbent particles.

In one embodiment, the processes can use a molecular sieve having a higher amount of the LEV phase in the intergrowth of the ERI phase and the LEV phase to achieve a particular composition of the product gas. For example, in one embodiment of the process for removing the acid gas from the feed gas stream, the process can comprise: contacting the feed gas stream with adsorbent particles comprising the molecular sieve having an intergrowth of the ERI phase and the LEV phase to provide the product gas stream with less than 2 Mol % $CO_2$, from 80 to 99 Mol % of the methane recovered from the feed gas stream, from 40 to 99 Mol % of the ethane recovered from the feed gas stream, and from 60 to 100 Mol % of the propane recovered from the feed gas stream; wherein the LEV phase is from 31 to 99% in the molecular sieve. One example of this type of molecular sieve is zeolite SSZ-105-A, and other zeolite SSZ-105 samples that are described in US 20170106357A1.

In one embodiment of the process using a higher amount of the LEV phase in the intergrowth of the ERI phase and the LEV phase, the molecular sieve can have a first calculated diffusion coefficient for a $C_2H_6$ uptake less than 4E-04 $s^{-1}$, such as from 3E-04 $s^{-1}$ to 1E-06 $s^{-1}$. In one embodiment of the process using a higher amount of the LEV phase in the intergrowth of the ERI phase and the LEV phase, the molecular sieve can have a second calculated diffusion coefficient for a $C_3H_8$ uptake less than 4E-06 s−1, such as from 3E-06 s−1 to 1E-07 $s^{-1}$. Diffusion coefficients may be measured by performing uptake rate measurements on porous materials and fitting the uptake rate curve to a diffusion model. Diffusion models are described by D. M. Ruthven in *Principles of Adsorption and Adsorption Processes*.

In one embodiment, the adsorbent particles are made from a homogeneous mixture and are not coated particles or made from layers of different materials. An example of how these adsorbent particles can be made is when the adsorbent particles are pressed into pellets from a powder. In one embodiment, the zeolite is mixed with a catalyst support and the zeolite and the catalyst support are ground together into a powder that is a homogeneous mixture. In one embodiment, the catalyst support is alumina, such as a pseudo-Boehmite alumina powder. The catalyst support can be inert or can participate in the adsorption performed by the adsorbent particles. Typical catalyst supports include various kinds of carbon, alumina, and silica. In one embodiment, the catalyst support comprises an amorphous silica aluminate. In one embodiment, the catalyst support comprises an amorphous silica aluminate and a second support material.

Examples of the catalyst support or the second support material (when used), can include kieselguhr, alumina, silica, and silica-alumina. Other examples include alumina-boria, silica-alumina-magnesia, silica-alumina-titania and materials obtained by adding other zeolites and other complex oxides thereto. In one embodiment, the catalyst support is porous, and comprises a natural clay or a synthetic oxide. The catalyst support can be selected to provide adequate mechanical strength and chemical stability at the contacting conditions under which the adsorbent particles are employed.

In one embodiment, the catalyst support or the second support material comprises a pseudo-boehmite alumina. Examples of pseudo-boehmite alumina are CATAPAL® high purity aluminas. CATAPAL® is a registered trademark of Sasol Limited. The pressed pellets can be broken and sieved to obtain the desired mesh size. In one embodiment, the powder X-ray diffraction (XRD) pattern of the pressed pellets is the same as the original XRD pattern of the zeolite powder prior to it having been pressed into a pellet.

In one embodiment, the zeolite SSZ-98 or the SSZ-105 has a cation as a framework ion. In one embodiment, the molecular sieve having an intergrowth of an ERI phase and a LEV phase has a cation as a framework ion. The cation can be selected from the group consisting of a sodium, a calcium, a potassium, a lithium, a magnesium, a barium, and combinations thereof. In one embodiment, the cation is sodium. In one embodiment, the cation is hydrogen. The choice of the cation can change the adsorption performance of the adsorbent particles.

In one embodiment, the feed gas stream is a natural gas that includes the acid gas, a methane, and an ethane. In one embodiment, the natural gas can also comprise up to 10,000 wppm water. In one embodiment, the feed gas stream additionally comprises a water. In one embodiment, the feed gas stream comprises a carbon dioxide and from 0 to 1000 wppm hydrogen sulfide. In one embodiment, the feed gas stream comprises at least about 95 Mol % total-methane and at least about 3 Mol % total-ethane. In one embodiment, the feed gas stream additionally comprises at least about 20 wppm of water, at least about 95 Mol % total-methane, and at least about 3 Mol % total-ethane. In one embodiment, the feed gas stream includes a methane, an ethane, a carbon dioxide, and from 4 to 1000 wppm hydrogen sulfide. In one embodiment, the feed gas stream comprises a carbon dioxide, a methane, and ethane, and a propane. Other constituents in the feed gas stream can be one or more of a hydrogen sulfide, a water, a hydrogen, a nitrogen, a carbonyl sulfide, and a helium.

In one embodiment, the acid gas is selected from the group consisting of the carbon dioxide, a hydrogen sulfide, a carbonyl sulfide, and combinations thereof.

In one embodiment, the method comprises alternating an input of the feed gas stream between at least two beds of the one or more adsorbent particles. In one embodiment, the at least two beds of the one or more adsorbent particles are up to ten beds of the one or more adsorbent particles. The feed gas stream can contact one of the at least two beds at a given time by an adsorption step and a tail gas stream can be simultaneously vented from another of the at least two beds by a desorption step.

In one embodiment, the feed gas stream has a flow rate less than 200 MMSCFD, such as from 1 to 100 MMSCFD, during the adsorption. In one embodiment, the adsorption occurs at an adsorption-temperature less than 90° C., such as from 20° C. to 80° C.

In one embodiment, the feed gas stream is input at a feed end of each of the at least two beds, the product gas stream is removed from a product end of each of the at least two beds, and the tail gas stream is vented from the feed end of the at least two beds.

In one embodiment, a portion of the tail gas stream can be recycled to the feed gas stream. In one embodiment, the recycling of the tail gas stream to the feed gas stream can increase the recoveries of methane and ethane by at least 1 Mol %. In one embodiment, the recycling can also lower the total vacuum requirements and gas compression costs. For example, wherein from greater than 0 wt % to about 50 wt % of the tail gas stream is recycled to the feed gas stream, this can thereby produce the product gas stream containing no greater than about 2 Mol % carbon dioxide, at least about 90 Mol % of the methane in the feed gas stream, and at least about 85 Mol % of total hydrocarbons in the feed gas stream.

In one embodiment, the contacting in the one of the at least two beds occurs at a feed pressure of from about 345 kPa to about 6895 kPa for a sufficient time to preferentially adsorb the contaminant from the feed gas stream and thereby producing the product gas stream. In one embodiment, the contacting produces the product gas stream containing no greater than about 2 Mol % carbon dioxide, at least about 10 wppm of the water, at least about 65 Mol % of the methane recovered from the feed gas stream, and at least about 25 Mol % of the ethane recovered from the feed gas stream. In one embodiment, the contacting produces the product gas stream containing no greater than about 2 Mol % carbon dioxide, at least about 10 wppm of the water, at least about 65 Mol % of the methane recovered from the feed gas stream, at least about 25 Mol % of the ethane recovered from the feed gas stream, no greater than about 1 wppm of the hydrogen sulfide, and no greater than about 1 wppm carbonyl sulfide. In one embodiment, the product gas stream contains at least about 80 Mol %, such as from 80 to 99 Mol %, of the methane recovered from the feed gas stream and at least about 40 Mol %, such as from 40 to 95 Mol %, of the ethane recovered from the feed gas stream.

In one embodiment, the product gas stream contains no greater than about 50 wppm hydrogen sulfide. In one embodiment, the product gas stream contains no greater than about 4 wppm hydrogen sulfide. In one embodiment, the product gas stream comprises no greater than about 4 wppm hydrogen sulfide and no greater than about 2000 wppm of water.

Figure 9:
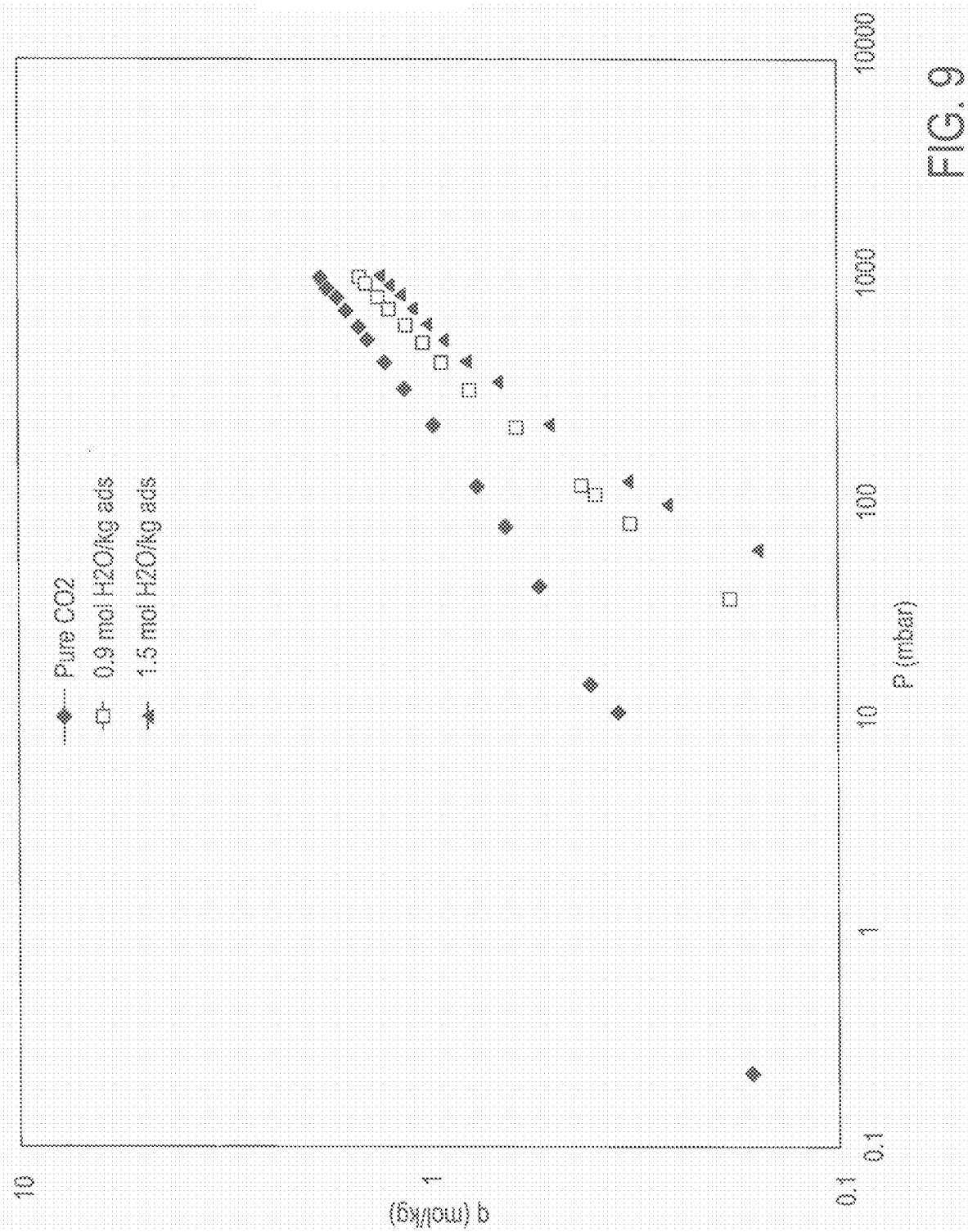
FIG. 9 (earlier FIG. 6) is a chart of plots of $CO_2$ adsorption on H-SSZ-98-A of gas feeds over a range of pressures and with varying amounts of $H_2O$ adsorbed.

In one embodiment, water in the feed gas stream is adsorbed by the at least two beds. In one embodiment, the water is adsorbed by the at least two beds of the one or more adsorbent particles and a $CO_2$ adsorption capacity of the one or more beds is not substantially decreased. In one embodiment, the $CO_2$ adsorption capacity is lowered by from 2 to 40 Mol % when the feed gas stream comprises from 0.5 to 5 moles of $H_2O$ per kg adsorbent from the feed gas stream. In one embodiment, the $CO_2$ adsorption capacity of the one or more adsorbent particles is lowered by less than 30 Mol %. This feature is shown in FIG. 9.

Figure 14:
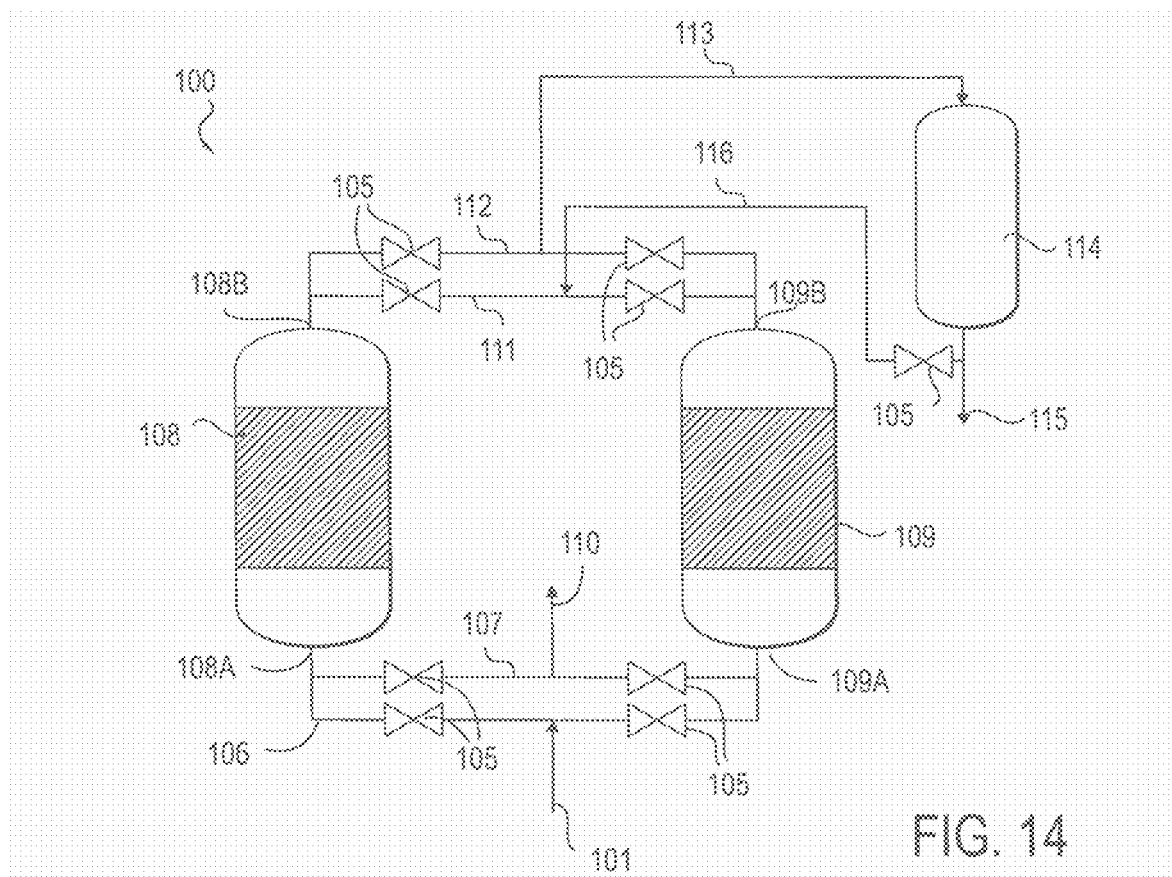
FIG. 14 (earlier FIG. 9) is a schematic diagram illustrating a two bed pressure swing adsorption (PSA) system.

Referring to FIG. 14, here is shown an exemplary two bed PSA system (100) with two beds. In this figure, a feed gas stream (101) is introduced into line (106) having block valves (105) therein. Line (106) connects the first inlet end (108A) to the first adsorption column (108), and also connects the second inlet end (109A) to the second adsorption column (109). A second line (107), is fluidly connected to line (106) and separately connects the first inlet end (108A) to the first adsorption column (108), and also connects the second inlet end (109A) to the second adsorption column (109). Second line (107) has an outlet for tail gas (110). The first adsorption column (108) contains the adsorbent particles described herein, and has a first product end (108B). The second adsorption column (109) also contains the adsorbent particles described herein, and has a second product end (109B). The first product end (108B) and the second product end (109B) are connected by a third line (111) and by a fourth line (112). The third line (111) and the fourth line (112) contain block valves (105). The fourth line (112) is connected with a fifth line (113), which delivers an intermediate product gas stream to a product gas buffer tank (114). The product gas buffer tank (114) allows for controlled purging and re-pressurization steps. The product gas stream (115) can be provided from the product gas buffer tank (114). The product gas buffer tank is controlled by one or more block valves (105) through a sixth line (116) that connects to the third line (111), as shown.

In one embodiment, wherein the method utilizes two beds of the one or more adsorbent particles, the method further comprises:

a. following the adsorption step in one of the two beds and a simultaneous desorption step in the other of the two beds, equalizing a pressure of the two beds through the product end of each of the two beds at the end of the adsorption and the simultaneous desorption step; and b. re-pressurizing the bed having just completed the simultaneous desorption step by sending a slipstream of the product gas stream through the product end of the bed having just completed the simultaneous desorption step.

In one embodiment, the at least two beds of the one or more adsorbent particles are four beds of the one or more adsorbent particles. This feature is shown in FIG. 16 and FIG. 17.

Figure 16:
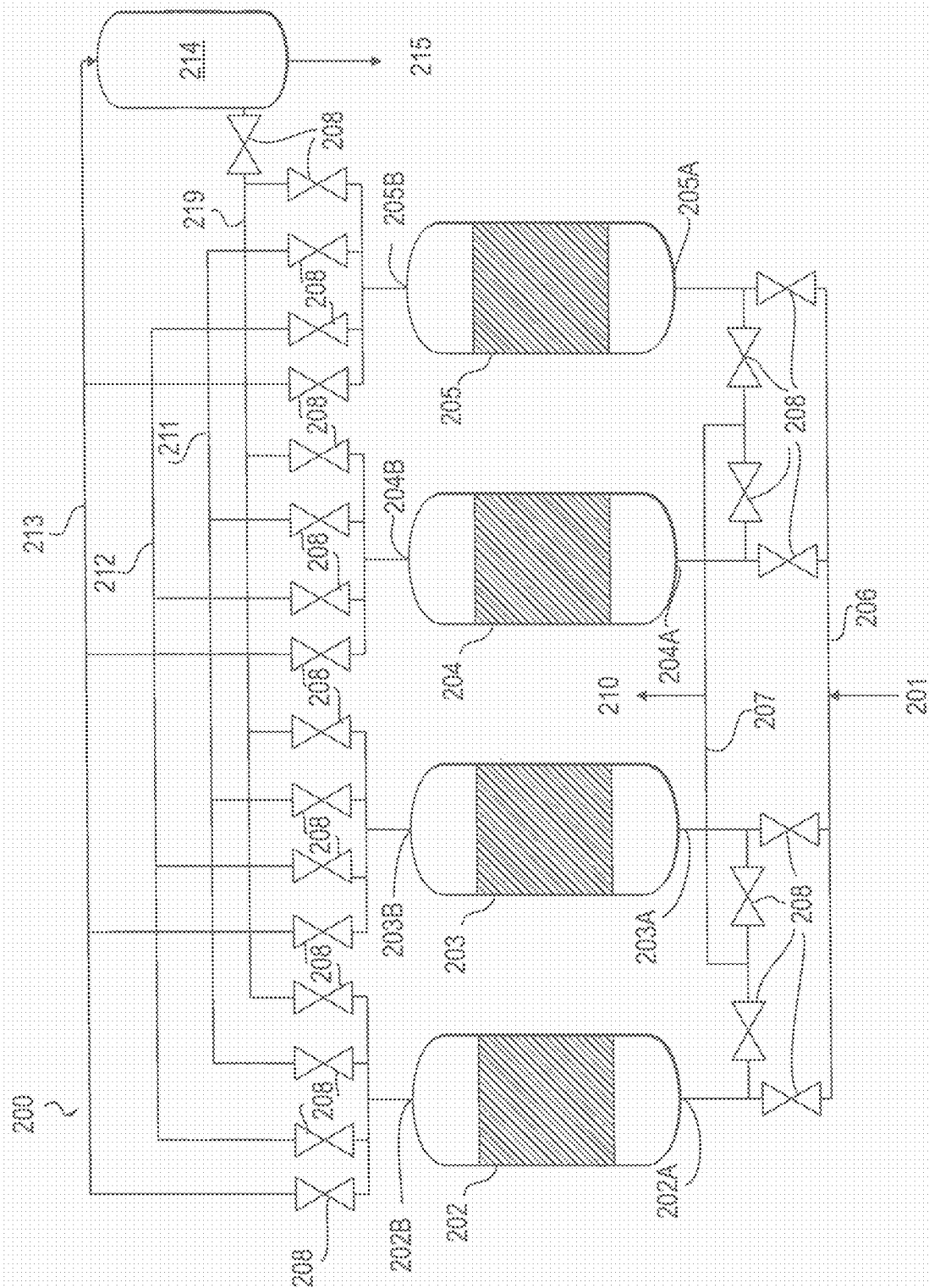
FIG. 16 (earlier FIG. 11) is a schematic diagram illustrating a four bed PSA system.
Figure 17:
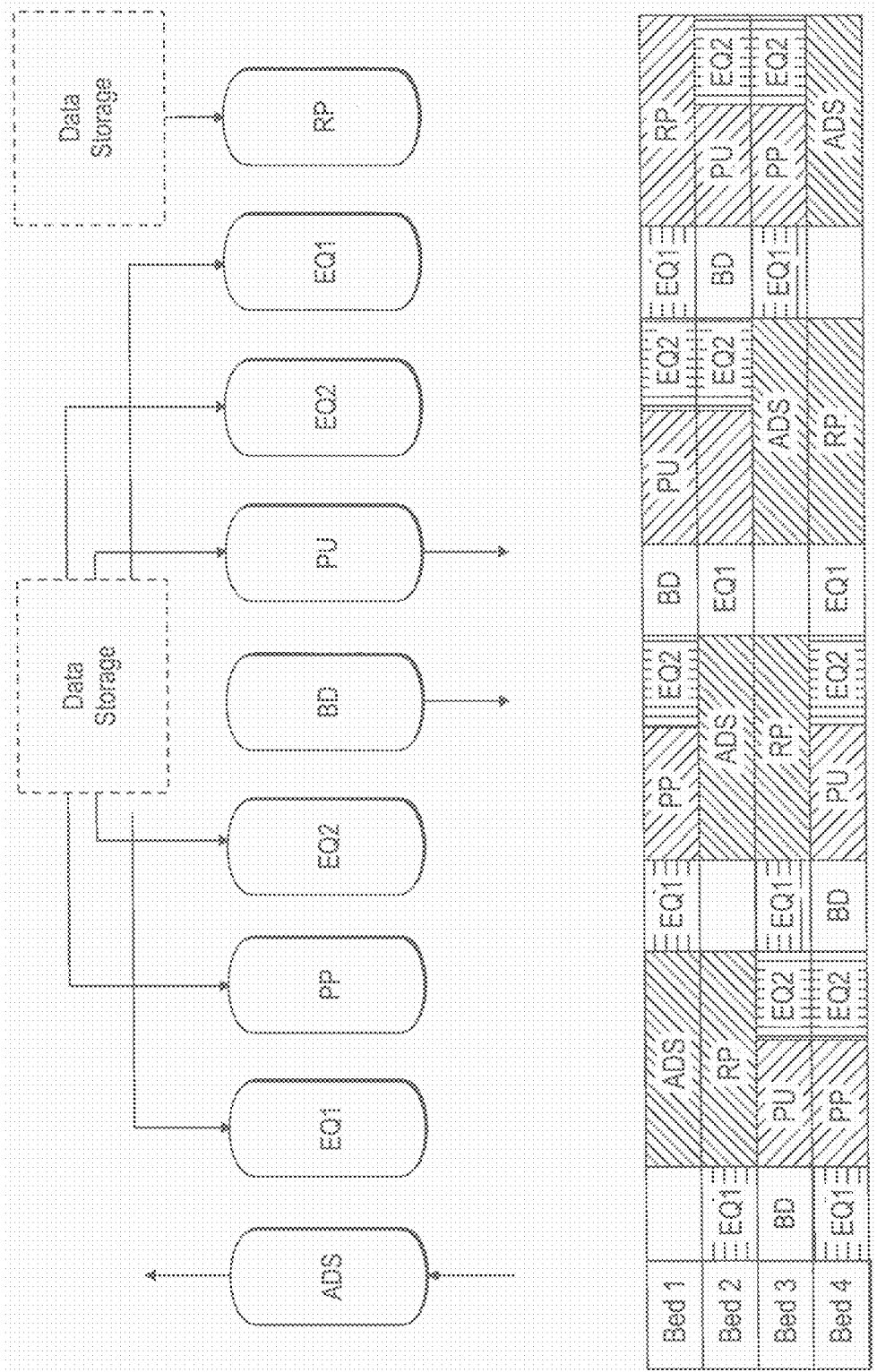
FIG. 17 (earlier FIG. 12) is a schematic diagram of the bed interaction scheme for the four bed PSA shown in FIG. 11.

Referring to FIG. 16, here is shown an exemplary four-bed-PSA system (200). In this system, the four adsorbent beds are fluidly connected to each other and are controlled in such a way that each bed cycles through a sequence of operations, also referred to as steps. The cycles of the four beds are synchronized with respect to each other. The operation of this exemplary four-bed-PSA system (200) is similar to the operation of the exemplary two bed PSA system (100) with two beds, described previously. A contaminated gas (201), similar to the feed gas stream (101), is fed into a first connecting line (206), having valves (208) therein. The valves (208) are block valves (105). There are four adsorption columns: the first bed (202), the second bed (203), the third bed (204) and the fourth bed (205). The first bed (202) has a first bed inlet (202A) and a first bed outlet (202B). The second bed (203) has a second bed inlet (203A) and a second bed outlet (203B). The third bed (204) has a third bed inlet (204A) and a third bed outlet (204B). The fourth bed (205) has a fourth bed inlet (205A) and a fourth bed outlet (205B). The bed inlets and outlets are at opposite ends of each of the beds. The first connecting line (206) connects the first bed inlet (202A), the second bed inlet (203A), the third bed inlet (204A), and the fourth bed inlet (205A). A second connecting line (207) is fluidly connected to the first connecting line (206) and also connects the first bed inlet (202A), the second bed inlet (203A), the third bed inlet (204A), and the fourth bed inlet (205A). The second connecting line (207) has an outlet for exiting tail gas (210). The first bed (202) has a first bed outlet (202B), the second bed (203) has a second bed outlet (203B), the third bed (204) has a third bed outlet (204B), and the fourth bed (205) has a fourth bed outlet (205B). All four of the product ends of each bed are connected by a third connecting line (211), a fourth connecting line (212), a fifth connecting line (213), and a sixth connecting line (219). Valves (208) are placed at multiple locations between the different lines to control the flow of effluents from the various beds shown. The sixth connecting line (219) and the fifth connecting line (213) are connected with a product gas buffer chamber (214). The product gas buffer chamber (214) is optional. The product gas buffer chamber (214), similar to the product gas buffer tank (114), allows controlled purging and repressurization steps. Eluted product gas (215) is shown in the drawing as exiting the product gas buffer chamber (214).

In one embodiment, the at least two beds of the one or more adsorbent particles are four beds of the one or more adsorbent particles, and the product gas stream contains at least about 80 Mol % of the methane recovered from the feed gas stream and at least about 40 Mol % of the ethane recovered from the feed gas stream.

In one embodiment, wherein the at least two beds of the one or more adsorbent particles are four beds, the method further comprises:

a. following a first adsorption step in a first bed of the four beds, a first equalization step occurs wherein the first bed is allowed to equalize in pressure with a second bed of the four beds having a lower-pressure than the first bed through a first line connecting the product end of the first bed and the product end of the second bed;

b. following the first equalization step, lowering pressure in the first bed and passing a gas from the first bed to a third bed of the four beds through a second line connecting the product end of the first bed and the product end of the third bed in a providing purge step such that the third bed of the four beds is purged;

c. following the providing purge step, a second equalization step occurs wherein the first bed is allowed to equalize in pressure with the third bed of the four beds having a lower-pressure than the first bed through a third line connecting the product end of the first bed and the product end of the third bed;

d. following the second equalization step, depressurizing the first adsorbent bed to a pressure from about 6.89 kPa to about 138 kPa through the feed end of the first adsorbent bed in a blowdown step comprising either:

i) allowing the gas in the first adsorbent bed to vent to a purge tank; or ii) using a vacuum pump to lower the pressure of the first adsorbent bed;

e. following the blowdown step, the first bed is purged in a purging step wherein the gas is provided to the first bed through the product end of the first bed from a fourth bed of the four beds while the first bed is at a pressure from about 6.89 kPa to about 138 kPa and gas is purged through the feed end of the first bed;

f. following the purging step, a third equalization step occurs wherein the first bed is allowed to equalize in pressure with the fourth bed having a higher-pressure than the first bed through a fourth line connecting the product end of the first bed and the product end of the fourth bed;

g. following the third equalization step, a fourth equalization step occurs wherein the first bed is allowed to equalize with the second bed having the higher-pressure than the first bed through a fifth line connecting the product end of the first bed and the product end of the second bed;

h. following the fourth equalization step, passing a slipstream of a product-gas or a stream of a storage gas from a storage tank through the product end of the first bed to repressurize the first bed to an adsorption-step-pressure in a repressurization step; and i. following the repressurization step, operating the first bed in an independent adsorption step for a sufficient period of time for the third bed and the fourth bed to be equalized in pressure and the second bed to be depressurized prior to beginning a second adsorption step;

wherein the second bed, the third bed, and the fourth bed are sequenced to cycle through the adsorption step, the first equalization step, providing purge step, the second equalization step, blowdown step, purging step, the third equalization step, the fourth equalization step and independent adsorption step in the same order as the first bed.

One advantage for the methods disclosed herein can be their short total cycle time. In one embodiment, wherein the method utilizes four beds as described previously, the first adsorption step, the first equalization step, the providing purge step, the second equalization step, the blowdown step, the purging step, the third equalization step, the fourth equalization step and the independent adsorption step can occur in a total cycle time less than 100 minutes, such as in a total cycle time from 400 to 3600 seconds.

One advantage for the methods and processes disclosed herein is that they can be performed in many different types of locations, including at refineries, at well heads, on ships, and even on offshore platforms or other remote locations. In one embodiment, the method or process is performed on an offshore platform.

Another advantage of the methods and processes disclosed herein can be their reduced specific vacuum power consumption. In one embodiment, the specific vacuum power consumption is less than 2000 kWh/MMSCF of the feed gas stream, such as from about 0 to about 1500 kWh/MMSCF of the feed gas stream. The kilowatt hour (kWh) is a derived unit of energy equal to 3.6 mega joules.

The transitional term "comprising", which is synonymous with "including," "containing," or "characterized by," is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

Only components relevant to the disclosure are shown in the figures, and many other components that might normally be part of a pressure swing adsorption (PSA) or vacuum swing adsorption (VSA) system are not shown for simplicity.

EXAMPLES

Example 1: Synthesis of Zeolite SSZ-98-A Samples 4.02 g of a 45 wt % potassium hydroxide (KOH) solution, 4.75 g of deionized water, and 5.00 g of CBV 760 Y-zeolite were mixed together in a TEFLON® liner. The CBV 760 Y-zeolite was obtained from Zeolyst International and had the following properties: $SiO_2/Al_2O_3$ mole ratio: 60, nominal cation form: Hydrogen, $Na_2O$ wt %: 0.03, unit cell size, A: 24.24, and surface area, $m^2/g$: 720. TEFLON® is a registered trademark of the Chemours company (formerly DuPont) which it uses for its range of fluoropolymers, the best known of which is polytetrafluoroethylene.

Then, 18.51 g of a 20 wt % trimethylphenylammonium hydroxide solution was added to the mixture in the liner. The resulting gel was stirred until it became homogeneous. The liner was capped and placed within a Parr steel autoclave reactor. The autoclave was placed in an oven and heated at 135° C. for 4 days. The autoclave reactor was cooled and the solid products were recovered from the cooled autoclave reactor by centrifugation, washed with deionized water, and dried at 95° C.

The resulting zeolite product was identified by powder XRD and scanning electron microscopy (SEM) as pure zeolite SSZ-98.

Example 2: Synthesis of Zeolite SSZ-98-B Samples 1.56 g of a 45 wt % KOH solution, 7.46 g of deionized water, and 2.00 g of CBV 720 Y-zeolite were mixed together in a TEFLON® liner. The CBV 720 Y-zeolite was obtained from Zeolyst International and had the following properties: $SiO_2/Al_2O_3$ mole ratio: 30, nominal cation form: Hydrogen, $Na_2O$ wt %: 0.03, unit cell size, A: 24.28, and surface area, $m^2/g$: 780.

Then, 7.17 g of a 20 wt % trimethylphenylammonium hydroxide solution was added to the mixture in the liner. The resulting gel was stirred until it became homogeneous. The liner was capped and placed within a Parr steel autoclave reactor. The autoclave was placed in an oven and heated at 135° C. for 4 days. The autoclave reactor was cooled and the solid products were recovered from the cooled autoclave reactor by centrifugation, washing with deionized water, and dried at 95° C.

The resulting zeolite product was identified by powder XRD and SEM as pure zeolite SSZ-98.

Example 3: Preparation of Zeolite SSZ-98 Test Samples

Test samples of zeolite SSZ-98 were used in two forms; $H^+$-cation and Na+-cation exchanged. The $H^+$-cation exchanged forms were prepared by ion exchange of the calcined zeolite SSZ-98 samples described previously with $NH_4Cl$ and then calcined to leave $H^+$ in the zeolite framework. Nat-cation exchanged forms were prepared by further ion exchange of $H^+$-cation exchanged forms with a NaCl solution. The cation-exchanged zeolite SSZ-98 test samples were activated at 400° C. under flowing $N_2$ for 8 hours prior to t-plot micro-pore volume (MPV) analysis. The t-plot micropore volume (MPV) was determined by $N_2$ physisorption experiments. A reference that describes how MPV is determined is B. C. Lippens, B. G. Linsen, J. H. de Boer, "Studies on pore systems in catalysts I. The adsorption of nitrogen; apparatus and calculation", Journal of Catalysis, Vol 3, Iss 1, 1964, 32-37. Table 1 summarizes the measured properties of these zeolite SSZ-98 test samples:

TABLE 1

| Zeolite SSZ-98 Sample | Cation | Si:Al Mole Ratio | MPV, $cm^3/g$ |
|---|---|---|---|
| SSZ-98-A | H+ | 19.7:1 | 0.15 |
| SSZ-98-B | H+ | 15.4:1 | 0.22 |

Example 4: Pure Component Equilibrium Gas Adsorption Measurements

Equilibrium gas adsorption measurements for $CO_2$, $CH_4$, $N_2$, $C_2H_6$, and $C_3H_8$ were made on a High Pressure Volumetric Analyzer (HPVA) 200-4 port volumetric system. Equilibrium vapor adsorption measurements for $H_2O$ were made on a Dynamic Vapor Sorption (DVS) vacuum gravimetric system. The prepared zeolite SSZ-98 test samples described in example 3 were first activated at 300° C. to obtain their dry weight, then they were re-activated in the gas adsorption system. The gases used were $CO_2$, $CH_4$, $N_2$, $C_2H_6$, $C_3H_8$, and He (all 99.999%). The gas adsorptions were measured at 0-50 bar for $CO_2$, 0-65 bar for $CH_4$, 0-10 bar for $C_2H_6$, 0-65 bar for $N_2$, and 0-3 bar for $C_3H_8$. The gas adsorptions were measured at 30° C. The $H_2O$ vapor adsorptions were measured at lower pressures, up to 280 mbar, due to limitations in generating vapor pressure up to 70° C.

FIGS. 1 to 4 show the equilibrium adsorption results for these gas adsorption measurements. The gases measured in these tests represent either major hydrocarbon components or impurities found in most raw, or untreated, natural gases. These gases included $CO_2$, $CH_4$, $C_2H_6$, and $C_3H_8$, which make up about 60 to 90 vol % of typical raw natural gases. If an adsorbent is capable of separating $CH_4$, $C_2H_6$, and $C_3H_8$ from $CO_2$, then most of the hydrocarbons can be recovered. This is especially important in lean gas mixtures, where very little heavier hydrocarbon components are found.

Because the adsorbent particles of zeolite SSZ-98 had relatively high Si:Al mole ratios, the $CO_2$ adsorption isotherms didn't show saturation at moderate temperatures until the $CO_2$ pressure reached above 10 bar.

The $C_2H_6$ adsorption isotherms in FIGS. 1 to 4 showed much lower saturation pressures, with very little increase in adsorbed capacity above 1 bar of pressure. Additionally, the $C_3H_8$ adsorption isotherms were very similar to the adsorption isotherms for $C_2H_6$.

Our measurements showed the adsorption affinity for the zeolite SSZ-98 test samples had the order: $C_3H_8>CO_2≈C_2H_6>CH_4>N_2$. This was similar to the adsorption affinity seen earlier with Na-SSZ-36. Gases with lower molecular weight, or lower polarity, show significantly lower enthalpies of adsorption onto zeolite SSZ-98. When processing raw natural gas streams containing significant amounts of $CO_2$, $H_2S$, or $H_2O$, rises in temperature inside the adsorption bed when removing these components would be expected during the adsorption cycle.

Figure 8:
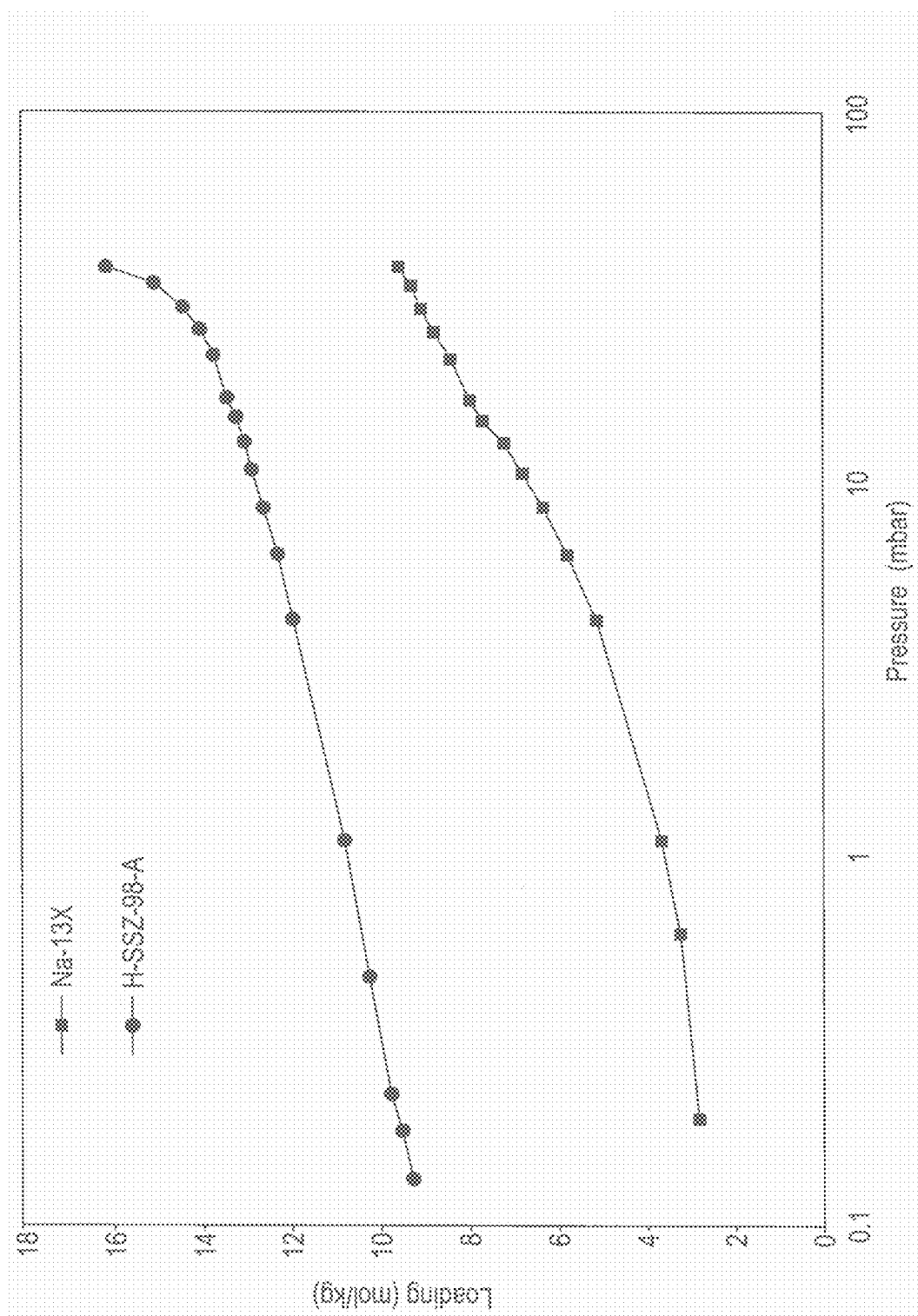
FIG. 8 (earlier FIG. 5) is a plot of the $H_2O$ vapor adsorption of H-SSZ-98-A compared with Na-13X.

Water vapor, which has an extremely high polarity, produces a heat of adsorption that correlates with the observed adsorption affinity. The $H_2O$ vapor adsorption affinity of the zeolite SSZ-98 test samples was lower than for other comparative zeolite samples, such as zeolite 5A, zeolite Na—X, or zeolite Na—Y. These comparative samples of zeolites all have a lower Si:Al mole ratio (<5) than the SSZ-98 test samples. The lower $H_2O$ vapor adsorption affinity of H-SSZ-98-A is compared with the higher $H_2O$ vapor adsorption affinity of Na-13X in FIG. 8. Zeolite SSZ-98 adsorbents with a lower affinity for $H_2O$ vapor adsorption can provide significantly reduced temperature increases and retained $CO_2$ adsorption when water is adsorbed during the method of acid gas removal.

Example 5: Effect of $H_2O$ on $CO_2$ Equilibrium Adsorption $H_2O$ and $H_2S$ are common impurities found in raw natural gas streams. When raw natural gas with these common impurities were treated using PSA or VSA processes using earlier adsorbents to reduce the contaminant these impurities lowered the adsorption performance. In the case of zeolite Na-13X, the presence of water lowered the adsorption capacity of the adsorbent by 70% or greater, depending on the partial pressure of $H_2O$ present in the gas. This feature is described in Y. Wang et al., "Adsorption Equilibrium of Binary Mixtures of Carbon Dioxide and Water Vapor on Zeolites 5A and 13X", J. Chem. Eng. Data, 2010, 55, 3189-3195.

The effect of increasing $H_2O$ loading on the $CO_2$ adsorption of H-SSZ-98-A was measured and is shown in FIG. 9. The measurement was done on a DVS Vacuum gravimetric adsorption microbalance. As the amount of water adsorbed was increased in the adsorbent particles, there was only a slight decrease in $CO_2$ adsorption capacity. At a loading of 0.9 Mol $H_2O$/kg on the adsorbent particles, and at 1.0 bar pressure, there was approximately 20% less $CO_2$ adsorbed. Increasing the $H_2O$ loading further, to a higher amount of 1.5 Mol $H_2O$/kg, only lowered by another 10% (there was approximately 30% less $CO_2$ adsorbed) the amount of $CO_2$ that was adsorbed. This demonstrated that even at high water loading on the adsorbent particles, the adsorption of $CO_2$ remained effective when using the adsorbent particles comprising zeolite SSZ-98.

The retained $CO_2$ adsorption at high water loading on the adsorbent particles comprising zeolite SSZ-98 was not appreciated previously and was unexpected.

Example 6: Kinetic Uptake of Zeolite SSZ-98 Adsorbents

Figure 10:
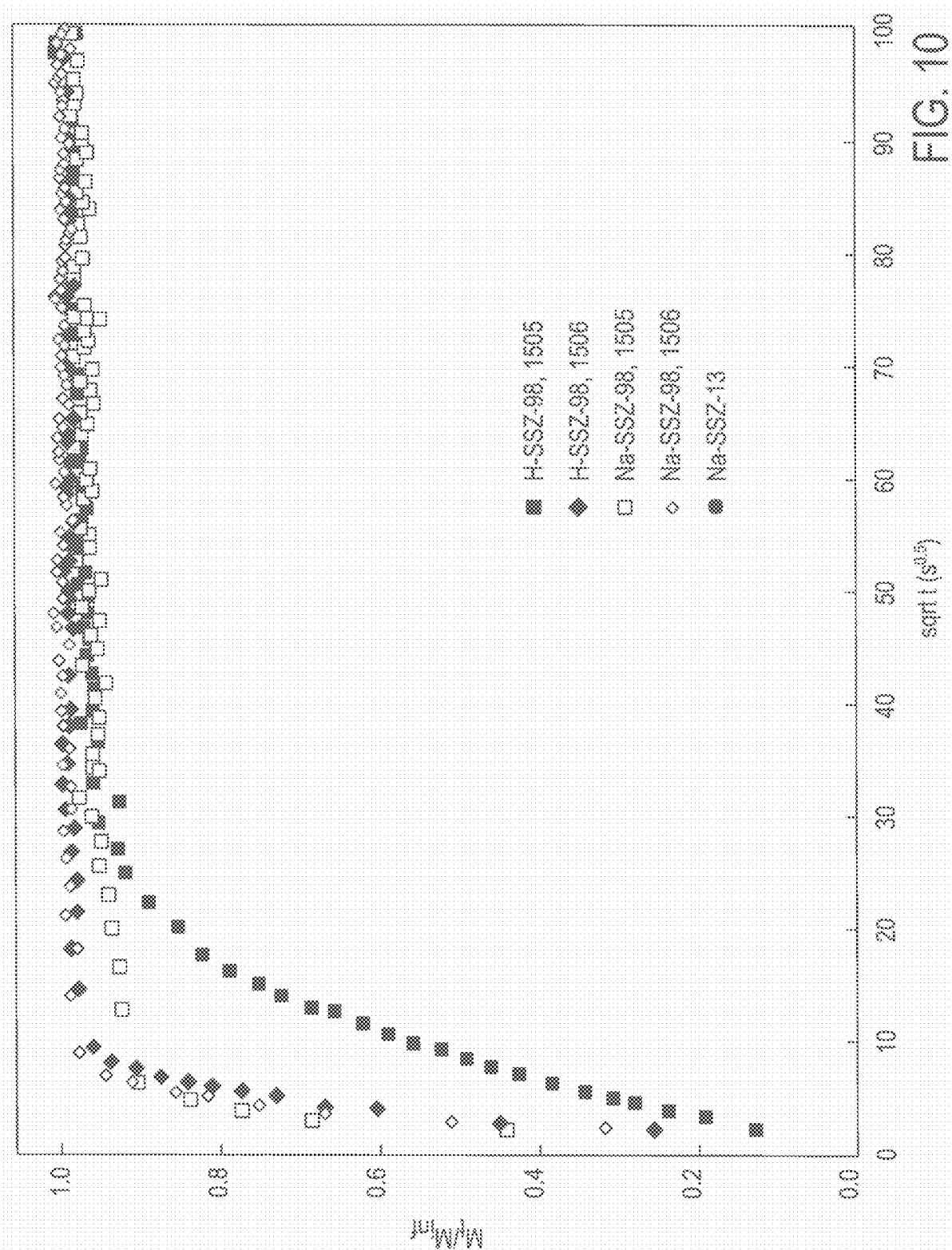
FIG. 10 (earlier FIG. 7) is a plot of kinetic uptake of $C_2H_6$ on four different samples of zeolite SSZ-98 and on a comparison sample of Na-SSZ-13.
Figure 11:
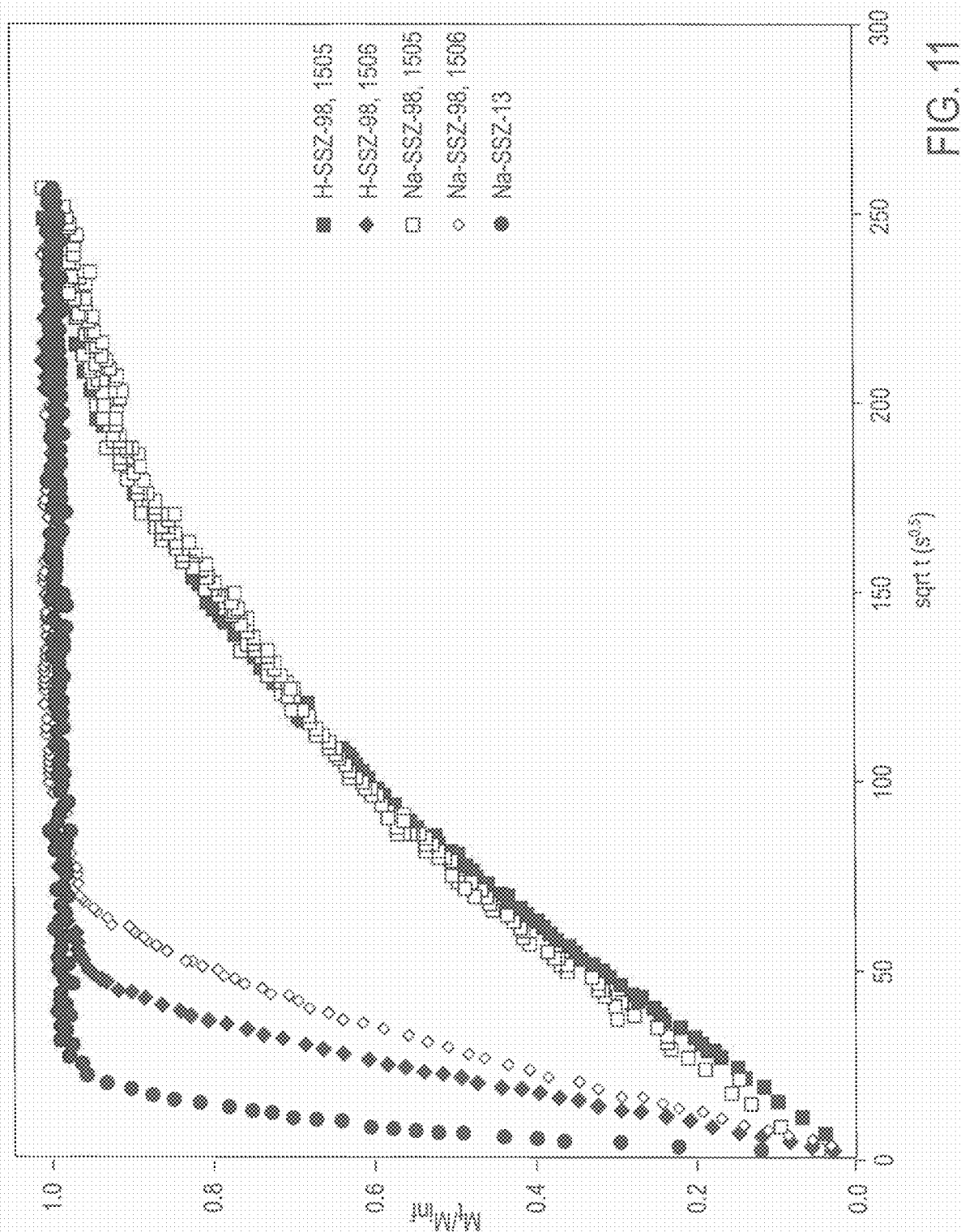
FIG. 11 (earlier FIG. 8) is a plot of kinetic uptake of $C_3H_8$ on four different samples of zeolite SSZ-98 and on a comparison sample of Na-SSZ-13.

Molecular sieving effects of the adsorption uptake of longer chain hydrocarbons, relative to uptake of carbon dioxide and other impurities removed in natural gas processing, play an important role in recovery of these longer chain hydrocarbons when removing $CO_2$, $H_2S$, and $H_2O$ from feed gas streams. FIGS. 10 and 11 show the measured kinetic uptakes of $C_2H_6$ and $C_3H_8$ on four zeolite SSZ-98 test samples, respectively, compared to another small-pore zeolite, Na-SSZ-13. As shown in FIG. 10, uptake of $C_2H_6$ was relatively fast among all of these small-pore zeolite test samples, and the calculation of the diffusion coefficients showed a fairly narrow range of diffusion coefficients among all five of the test samples (between 4E-04 $s^{-1}$ and 2E-03 $s^{-1}$). However, in FIG. 11, it is shown that there was an appreciably lower uptake of $C_3H_8$ with all of the zeolite SSZ-98 test samples compared with the Na-SSZ-13. There were generally three orders of magnitude slower adsorption kinetics for the zeolite SSZ-98 test samples compared to the Na-SSZ-13 for the uptake of $C_3H_8$. The calculated diffusion coefficients for the $C_3H_8$ uptake in the zeolite SSZ-98 test samples were only from 4E-06 $s^{-1}$ to 2E-04 $s^{-1}$.

Example 7: Synthesis of SSZ-105-A Samples 1.20 g of a 45 wt % KOH solution, 0.19 g of a 50 wt % NaOH solution, and 3.00 g of CBV 780 Y-zeolite powder (Zeolyst International, $SiO_2$/$Al_2O_3$ mole ratio=80) were mixed together in a TEFLON® liner. Then, 27.61 g 9.19 wt % N,N-dimethylpiperidinium hydroxide solution was added to the mixture in the liner. The resulting gel was stirred until it became homogeneous. The liner was then capped and placed within a Parr steel autoclave reactor. The autoclave was then put in an oven heated at 150° C. for 4 days. The autoclave reactor was cooled and the solid products were recovered from the cooled autoclave reactor by centrifugation, washed with deionized water, and dried at 95° C. The resulting zeolite product was identified by powder XRD and SEM as a pure zeolite SSZ-105. The product had a $SiO_2$/$Al_2O_3$ mole ratio of 16.7, as determined by ICP elemental analysis. A comparison between the experimental powder XRD pattern collected from the calcined product and DIF-FaX simulated powder XRD patterns with various ERI/LEV intergrowth ratios indicated that the product was an intergrowth material with approximately 50-60% of ERI framework type molecular sieve and 40-50% LEV framework type molecular sieve. In the case of crystals with planar faults, interpretation of X-ray diffraction patterns requires an ability to simulate the effects of stacking disorder. DIFFaX is a computer program based on a mathematical model for calculating intensities from crystals containing planar faults. (See, M. M. J. Treacy et al., Proceedings of the Royal Chemical Society, London, A (1991), Vol. 433, pp. 499-520). DIFFaX is the simulation program selected by and available from the International Zeolite Association to simulate the XRD powder patterns for intergrown phases of molecular sieves. (See, "Collection of Simulated XRD Powder Patterns for Zeolites" by M. M. J. Treacy and J. B. Higgins, 2001, Fourth Edition, published on behalf of the Structure Commission of the International Zeolite Association). It has also been used to theoretically study intergrown phases of AEI, CHA and KFI molecular sieves, as reported by K. P. Lillerud et al. in "Studies in Surface Science and Catalysis", 1994, Vol. 84, pp. 543-550. DIFFaX is a well-known and established method to characterize disordered crystalline materials with planar faults such as intergrown molecular sieves.

Figure 5:
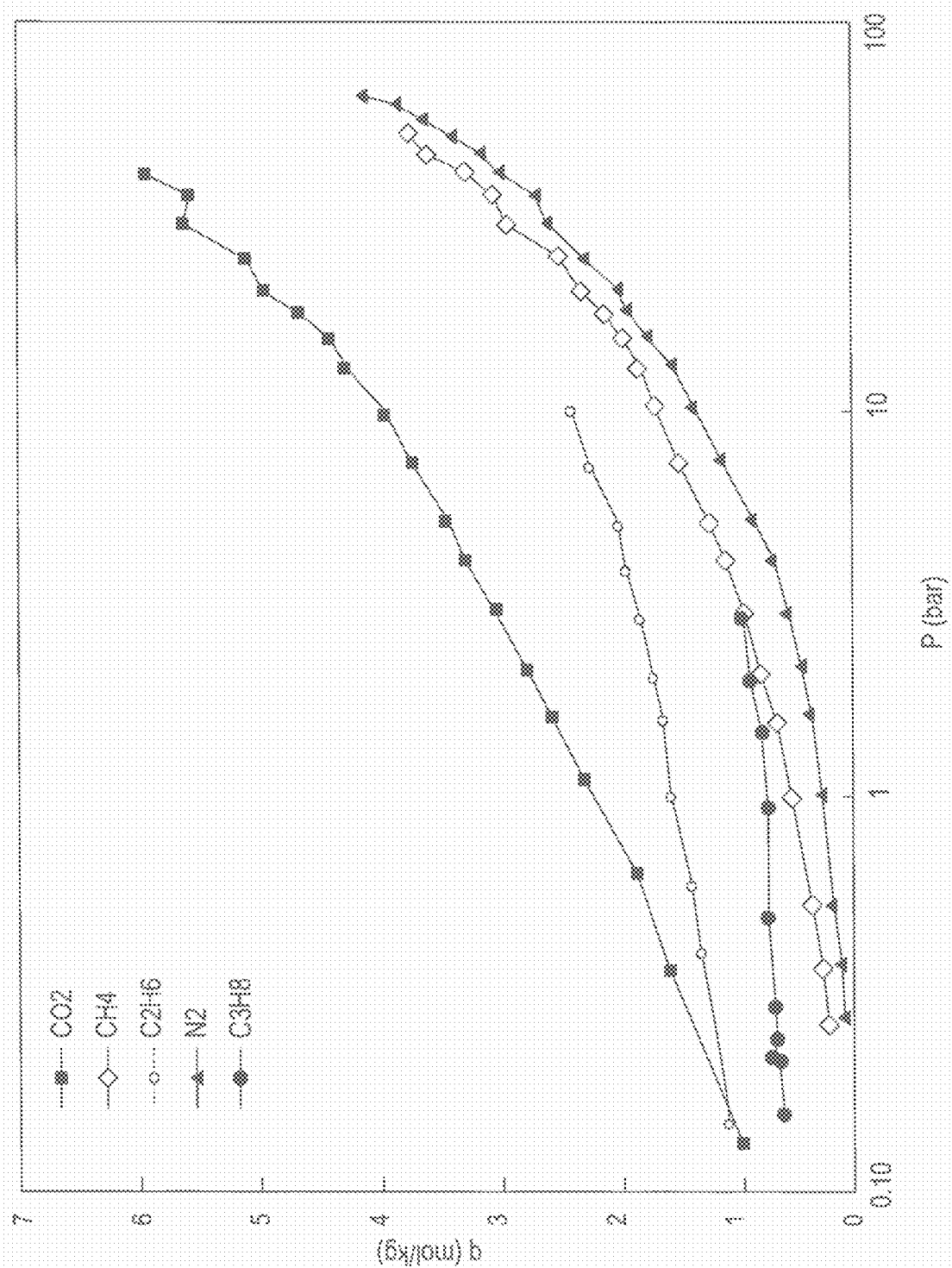
FIG. 5 (new) is a plot of the equilibrium adsorption results for $CO_2$, $C_2H_6$, $CH_4$, $N_2$, and $C_3H_8$ on SSZ-105-A at 30° C.

The DIFFaX simulated powder XRD patterns with known various ERI/LEV intergrowth ratios are shown in FIG. 5 in US20170106357A1.

Example 8: Synthesis of SSZ-105-B Samples

The same synthesis procedure as Example 1 was followed except that CBV 780 Y-zeolite powder was replaced by CBV 720 Y-zeolite powder (Zeolyst International, $SiO_2$/$Al_2O_3$ mole ratio=20). The resulting zeolite product was identified by powder XRD and SEM as a pure zeolite SSZ-105. The product had a $SiO_2$/$Al_2O_3$ mole ratio of 13.6, as determined by ICP elemental analysis. A comparison between the experimental powder XRD pattern collected from the calcined product and DIFFaX simulated powder XRD patterns with various ERI/LEV intergrowth ratios indicated that the product was an intergrowth material with approximately 80-90% of ERI framework type molecular sieve and 10-20% LEV framework type molecular sieve.

Example 9: Synthesis of SSZ-105-C Samples 1.51 g of a 45 wt % KOH solution, 0.39 g of a 50 wt % NaOH solution, and 3.00 g of CBV 760 Y-zeolite powder (Zeolyst International, $SiO_2$/$Al_2O_3$ mole ratio=60) were mixed together in a TEFLON® liner. Then, 27.61 g of 9.19 wt % N,N-dimethylpiperidinium hydroxide solution was added to the mixture in the liner. The resulting gel was stirred until it became homogeneous. The liner was then capped and placed within a Parr steel autoclave reactor. The autoclave reactor was then put in an oven heated at 150° C. for 4 days. The autoclave reactor was cooled. The solid products were recovered from the cooled autoclave reactor by centrifugation, washing with deionized water, and dried at 95° C. The resulting zeolite product was identified by powder XRD and SEM as a pure zeolite SSZ-105. The product had a $SiO_2$/$Al_2O_3$ mole ratio of 14.5, as determined by ICP elemental analysis. A comparison between the experimental powder XRD pattern collected from the calcined product and DIFFaX simulated powder XRD patterns with various ERI/LEV intergrowth ratios indicated that the product was an intergrowth material with approximately 70-80% of ERI framework type molecular sieve (ERI Phase) and 20-30% LEV framework type molecular sieve (LEV Phase).

Example 10: Micropore Characterization of SSZ-105 Samples

SSZ-105 samples were analyzed for micropore volume by $N_2$ physisorption at −196° C. Activation at 300° C. was performed prior to adsorption to remove residual water adsorbed on the zeolite samples. A summary in Table 2 shows that the increasing substitution of the ERI framework type molecular sieve with the LEV framework type molecular sieve reduced the micropore volume slightly while the lower substituted zeolite SSZ-105 samples had similar micropore volumes as SSZ-98-B. The intergrowth of LEV-ERI framework type molecular sieves with lower pore volumes affected the gas adsorption properties for separation of $CO_2$ from hydrocarbon mixtures, as discussed in later examples. Table 2 summarizes the measured properties of these zeolite SSZ-105 test samples.

TABLE 2

| Zeolite SSZ-105 Sample | ERI Phase (%) | LEV Phase (%) | Si:Al Mole Ratio | MPV, cm$^3$/g |
|---|---|---|---|---|
| SSZ-105-A | 50-60 | 40-50 | 16.7:1 | 0.20 |
| SSZ-105-B | 80-90 | 10-20 | 13.6:1 | 0.22 |
| SSZ-105-C | 80-70 | 20-30 | 14.5:1 | 0.22 |

Example 11: Pure Component Equilibrium Adsorption

Equilibrium gas adsorption experiments for $CO_2$, $CH_4$, $N_2$, $C_2H_6$ and $C_3H_8$ were performed on a HPVA 200-4 port volumetric gas adsorption system. Samples were first activated at 300° C. to obtain the dry weight and then reactivated in the gas adsorption system. The gases used were $CO_2$, $CH_4$, $N_2$, $C_2H_6$, $C_3H_8$ and He (all 99.999%). The zeolite SSZ-105 samples were tested from 0-50 bar for $CO_2$, 0-65 bar for $CH_4$, 0-10 bar for $C_2H_6$, 0-65 bar for $N_2$, and 0-3 bar for $C_3H_8$.

Figure 6:
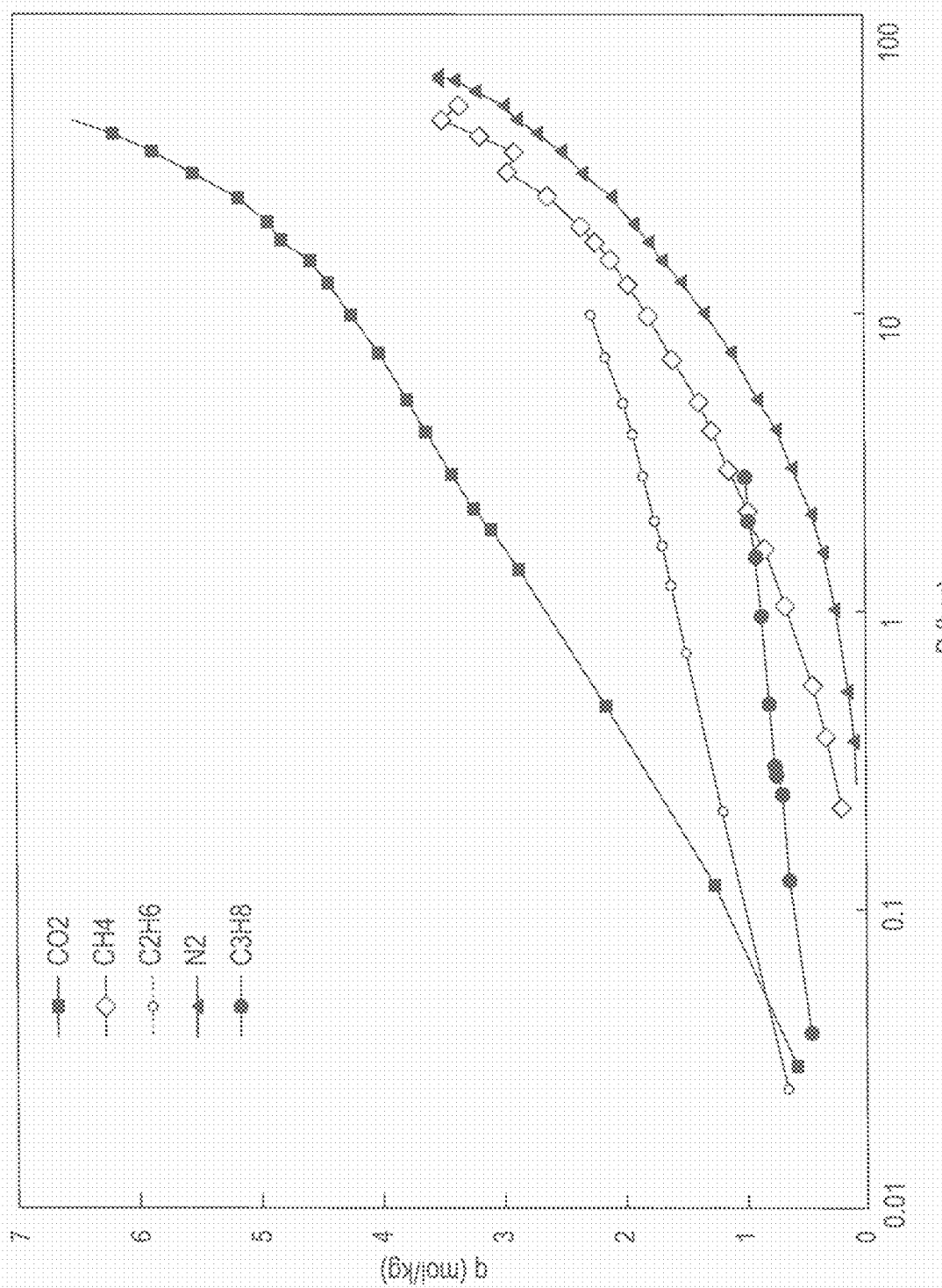
FIG. 6 (new) is a plot of the equilibrium adsorption results for $CO_2$, $C_2H_6$, $CH_4$, $N_2$, and $C_3H_8$ on SSZ-105-B at 30° C.
Figure 7:
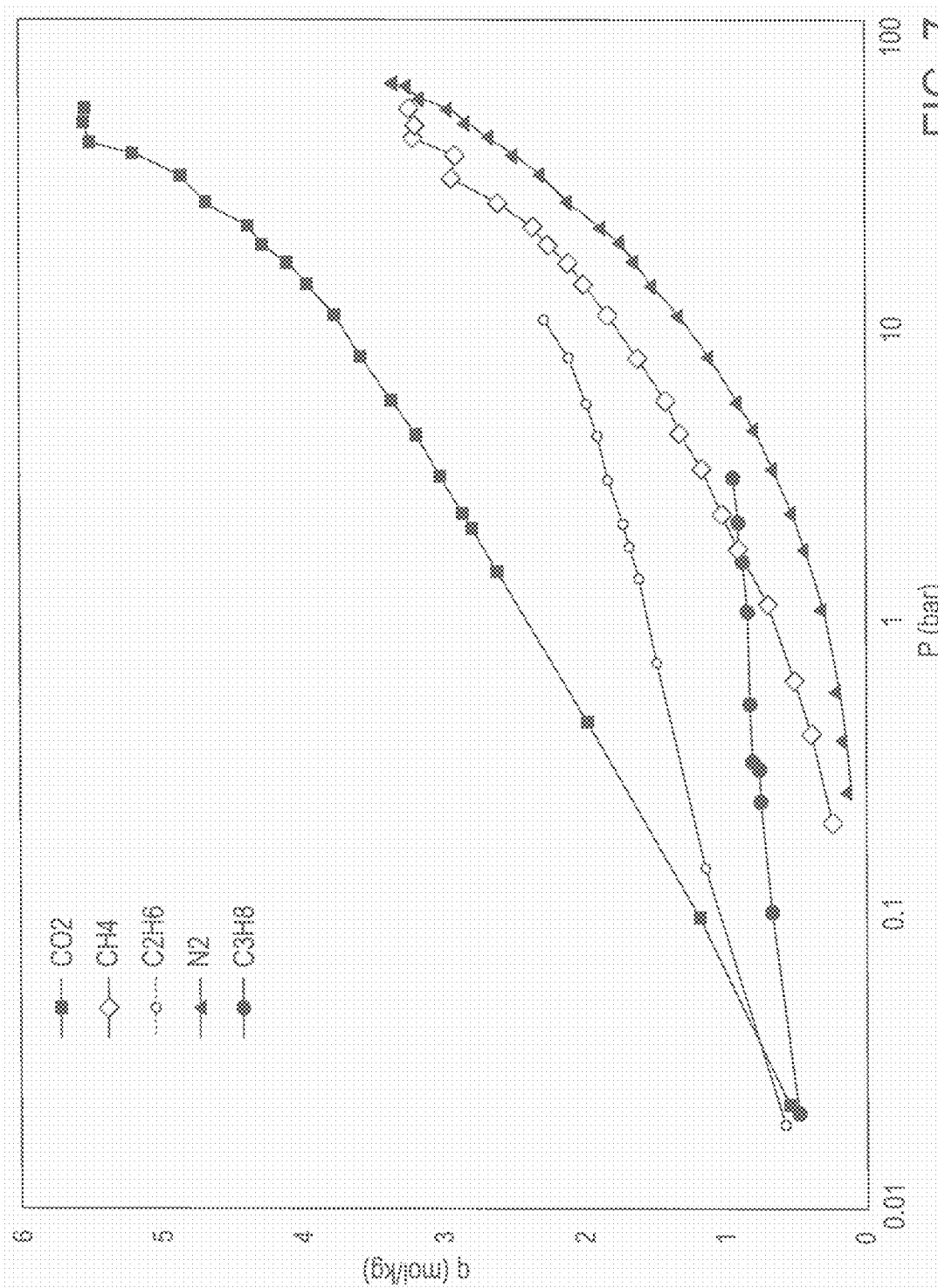
FIG. 7 (new) is a plot of the equilibrium adsorption results for $CO_2$, $C_2H_6$, $CH_4$, $N_2$, and $C_3H_8$ on SSZ-105-C at 30° C.

FIGS. 5-7 show the equilibrium adsorption results for these gas adsorption tests. The gases measured represented either major hydrocarbon components or major impurities found in natural gas wells, with $CO_2$, $CH_4$, $C_2H_6$, and $C_3H_8$ making up 60-90 vol % of most natural gas wells. An adsorbent that is capable of separating $CH_4$, $C_2H_6$ and $C_3H_8$ from $CO_2$, can recover most of the hydrocarbons, especially when used in the application of lean gas mixtures, where very little heavier hydrocarbon components are found.

Because the samples had a low amount of aluminum in the zeolite framework, the $CO_2$ adsorption isotherms did not show saturation at moderate temperatures until the $CO_2$ pressure reached above 10 bar. The $C_2H_6$ adsorption isotherms showed much lower saturation pressures with very little increase in adsorbed capacity above 1 bar of pressure. In addition, $C_3H_8$ showed very similar adsorption behavior, with very little increase in adsorbed capacity above 1 bar of pressure, as with $C_2H_6$.

Uniquely different from zeolite SSZ-98 samples, zeolite SSZ-105 had a tunable LEV intergrowth phase that affected the adsorption capacity and affinity for specific gases as shown in FIGS. 5-7. In particular, the adsorption of $C_3H_8$ had less capacity, e.g., less than 1 mol/kg, when the LEV intergrowth phase was present, while the $CO_2$ adsorption capacity was comparable to the pure SSZ-98 samples having only a ERI phase.

FIG. 5, FIG. 6, and FIG. 7 demonstrate a process wherein the changing of the substitution of the ERI phase with a LEV phase in a molecular sieve having an intergrowth of the ERI phase and the LEV phase did not significantly reduce the equilibrium adsorption of a carbon dioxide in the feed gas stream. Additionally, the changing of the substitution did not have a deleterious effect of increasing the equilibrium adsorption of a methane. In these examples, the reduction in the equilibrium adsorption of the carbon dioxide in the feed gas stream was between zero to 2.0 mol/kg. In one embodiment, the reduction in the equilibrium adsorption of the carbon dioxide can be from zero to 1.0 mol/kg.

FIG. 3, FIG. 5, FIG. 6, and FIG. 7 also demonstrate methods and processes for removing an acid gas from a feed gas stream, wherein the one or more adsorbent particles comprise the zeolite SSZ-98 or the zeolite SSZ-105; and wherein the first equilibrium adsorption of a carbon dioxide in the feed gas stream is greater than 5 mol/kg (e.g., from 5 to 7.5 mol/kg), the second equilibrium adsorption of a methane is less than 4 mol/kg, the third equilibrium adsorption of an ethane is less than 2.5 mol/kg, and the fourth equilibrium adsorption of a propane is less than 1.0 mol/kg.

Example 12: Kinetic Uptake of SSZ-105 Adsorbents

Figure 12:
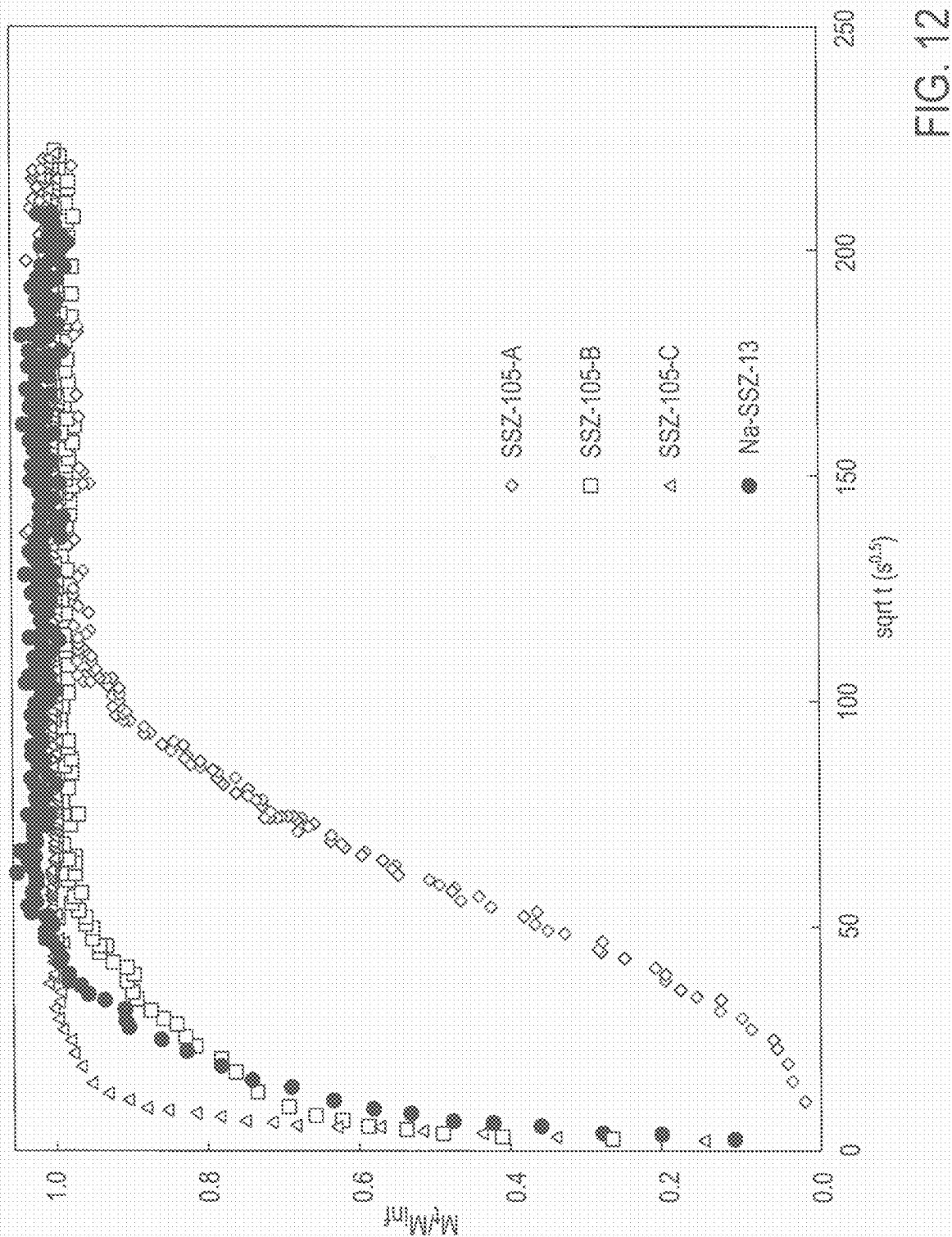
FIG. 12 (new) is a plot of kinetic uptake of $C_2H_6$ on three different samples of SSZ-105 and on a comparison sample of Na-SSZ-13.
Figure 13:
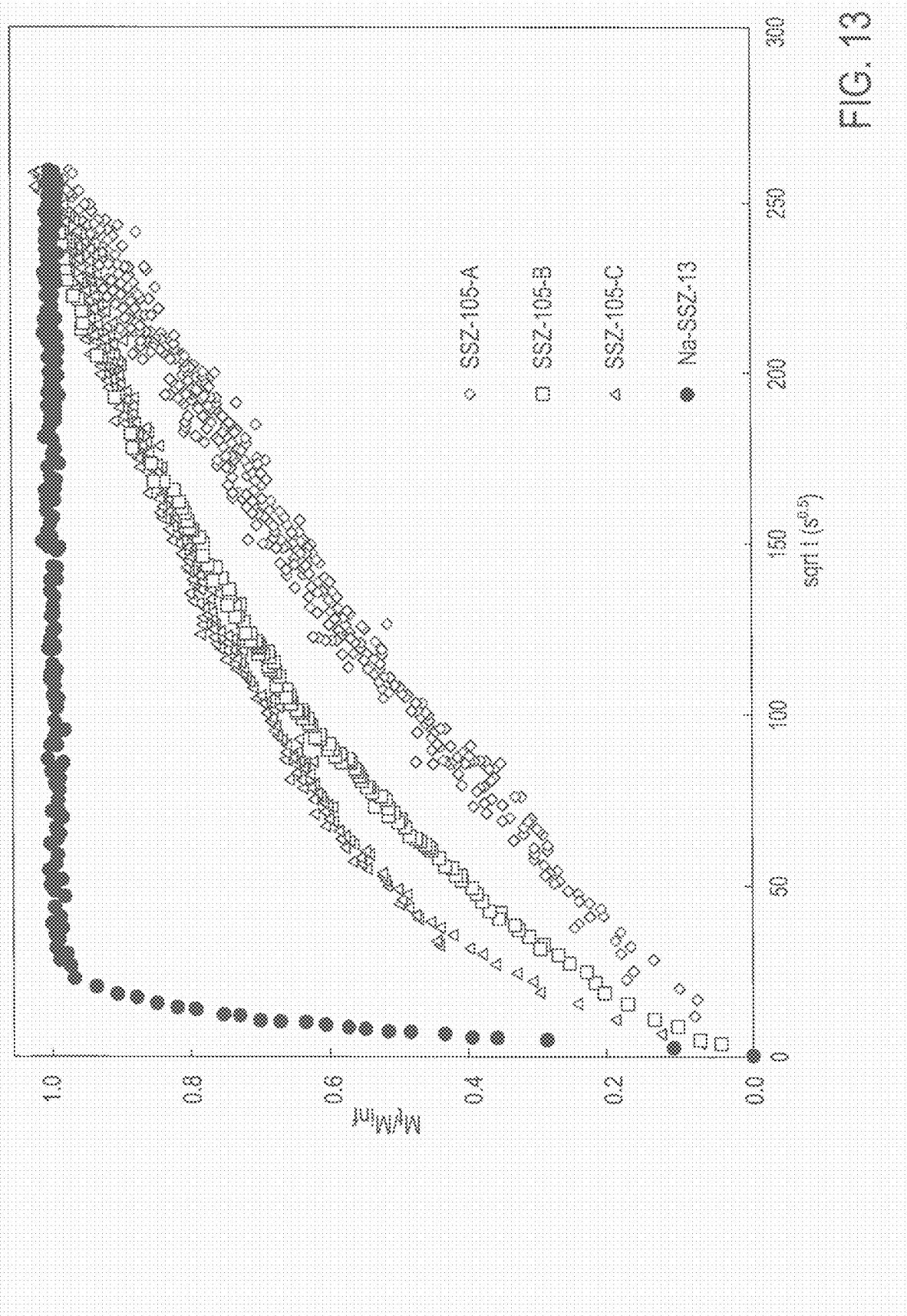
FIG. 13 (new) is a plot of kinetic uptake of $C_3H_8$ on three different samples of SSZ-105 and on a comparison sample of Na-SSZ-13

Molecular sieving effects in the adsorption uptake of longer chain hydrocarbons, relative to uptake of carbon dioxide and other impurities removed in natural gas processing, play an important role in recovery of these longer chain hydrocarbons (such as ethane and propane) when removing $CO_2$, $H_2S$, and $H_2O$ from natural gas. Similar to zeolite SSZ-98, zeolite SSZ-105 showed higher kinetic selectivity for $C_2H_6$ and/or $C_3H_8$ diffusion separation as compared to other small-pore zeolite materials. Ethane and propane are important in natural gas processing, as hydrocarbons with three or more carbons can be difficult to remove if they are adsorbed onto the adsorbent material. The slow uptake of ethane and or propane allows the cycling of the adsorbent to prevent complete uptake of these hydrocarbons. Cycling of the adsorbent can be used to maintain higher recovery of the slower-adsorbing compounds during adsorption. FIG. 12 and FIG. 13 show kinetic uptakes of $C_2H_6$ and $C_3H_8$ by the zeolite SSZ-105 samples, respectively, compared to another small-pore zeolite material, Na-SSZ-13. As shown in FIG. 12, uptake of $C_2H_6$ was relatively fast among all the small-pore zeolite materials, except for zeolite SSZ-105-A. The calculation of diffusion constants showed a range of calculated diffusion coefficients among the five samples (from $1E-05$ $s^{-1}$ to $5E-03$ $s^{-1}$). The calculated diffusion coefficients varied depending on the amount of LEV intergrowth phase in the zeolite SSZ-105 samples. The calculated diffusion coefficient for the $C_2H_6$ uptake in the zeolite SSZ-105-A test sample was surprisingly low, only $1E-05$ $s^{-1}$. This was much lower than was calculated for the other zeolite SSZ-105 samples with lower amounts of the LEV intergrowth phase, and was also lower than the calculated diffusion coefficients for the $C_2H_6$ uptake in all of the zeolite SSZ-98 samples described earlier.

As shown in FIG. 13, uptake of $C_3H_8$ in the zeolite SSZ-105 samples was significantly lower than the uptake of $C_2H_6$. All of the zeolite SSZ-105 samples showed three orders of magnitude slower adsorption kinetics (calculated diffusion coefficients) compared to the other adsorbent materials (from $1E-06$ $s^{-1}$ to $1E-05$ $s^{-1}$). Again, the calculated diffusion coefficients varied depending on the amount of LEV intergrowth phase in the zeolite SSZ-105 samples. The calculated diffusion coefficient for the $C_3H_8$ uptake in the zeolite SSZ-105-A was only $1E-06$ $s^{-1}$.

Example 13: Pressure Swing Adsorption Process Performance

PSA and VSA modeling can provide a target for actual process performance by predicting the expected hydrocarbon recovery and $CO_2$ removal for feed gas stream separations.

A PSA simulation is set up with the adsorption bed initially saturated with the feed gas at the feed pressure. Once the steady-state is determined by monitoring both the mass and thermal balance between cycles, the simulation can be stopped, and all necessary parameters recorded. The simulation is expected to take between 50 to 500 cycles to reach steady-state, depending on the process parameters being examined. This simulation approach uses a data buffer strategy, combined with a single bed, to simulate the effect of changing gas concentrations entering and exiting the adsorbent bed.

Figure 15:
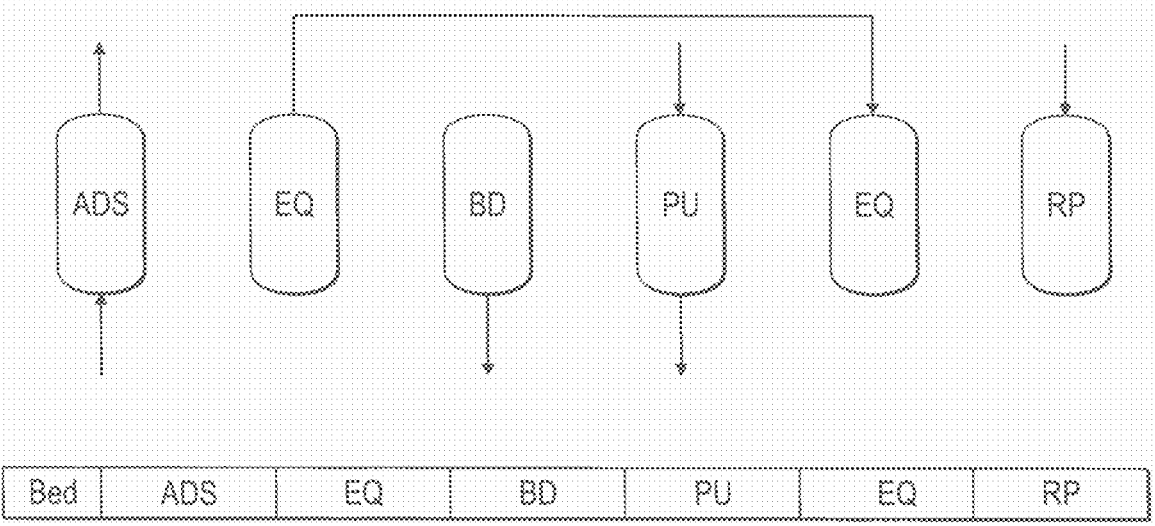
FIG. 15 (earlier FIG. 10) is a schematic diagram of the bed interaction scheme for the two bed PSA shown in FIG. 9.

The two bed PSA system looks like the process diagram shown in FIG. 14, and described previously. FIG. 15 shows the general PSA cycle arrangement and bed interaction scheme for the exemplary two bed PSA system (100). In this figure, "ADS" refers to adsorption step, "EQ" refers to equalization step, "BD" refers to blowdown step, "PU" refers to purging step, and "RP" refers to re-pressurization step. PSA simulations using this two bed PSA system with zeolite SSZ-98 are expected to provide maximum recoveries of $CH_4$ to be about 40 to 70 Mol %.

The four bed PSA system looks like the process diagram shown in FIG. 16. The bed interaction scheme for this four bed PSA system is shown in FIG. 17. PSA simulations using this four bed PSA system with zeolite SSZ-98 would show improved recoveries of $CH_4$ over the two bed PSA system.

The step configuration in the bed interaction scheme for the four bed PSA system used in this example was adopted from earlier PSA separations for hydrogen purification, described in M. Luberti et al., "Design of a $H_2$ PSA for Cogeneration of Ultrapure Hydrogen and Power at an Advanced Integrated Gasification Combined Cycle with Pre-Combustion Capture", Adsorption, 2014, 20, 511-524. FIG. 17 shows how the four beds interact with each other during the simulations, and where data storage is utilized. The total cycle time in the four bed PSA simulations can be fixed at 800 seconds, with the adsorption time fixed at 200 seconds. By having the adsorption time at ¼th of the total cycle time, a continuous production of a high quality product gas stream can be obtained.

Figure 18:
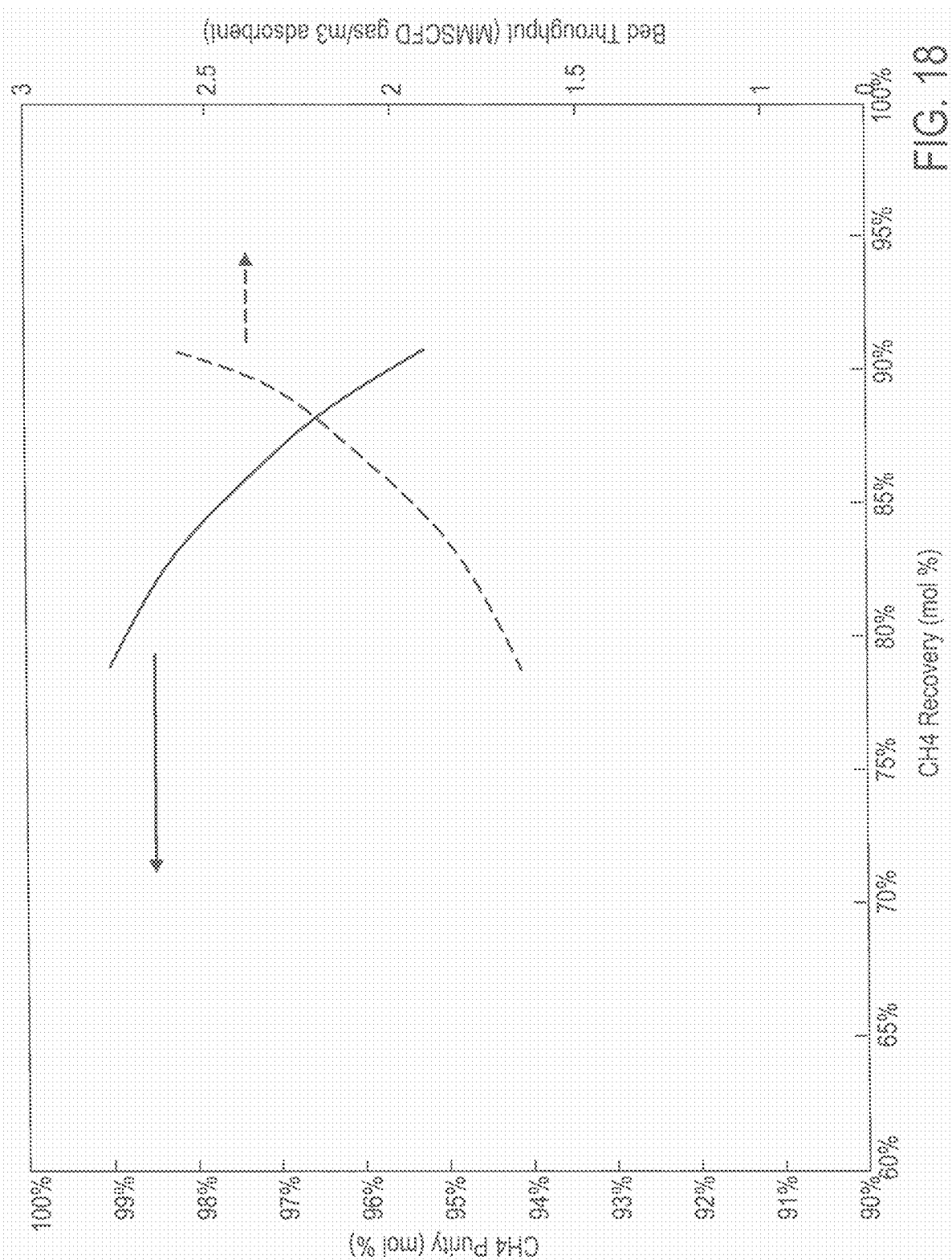
FIG. 18 (earlier FIG. 13) is a plot of the adsorption cycle performance in a four bed PSA for zeolite SSZ-98.

The adsorption cycle performance of the four bed PSA system using Na-SSZ-98-A was determined with a feed gas stream comprising 10 Mol % $CO_2$, with the balance of the feed gas stream being $CH_4$. The feed pressure during these simulations was 70 bar (1000 psig). The desorption pressure in these simulations was set at 1 bar (0 psig) to simulate a PSA process for purifying high-pressure natural gas. The results of this simulation are shown in FIG. 18. FIG. 18 shows that increasing $CH_4$ product purity caused reduced $CH_4$ recovery, and increased $CH_4$ product purity causing reduced bed throughput. As the target $CO_2$ concentration changed, increasing the $CH_4$ purity of the product gas, the recovery of $CH_4$ was observed to decrease. For example, as the $CH_4$ product purity specification was increased to 98 Mol %, the bed throughput decreased to approximately 1.25 MMSCFD gas/$m^3$ adsorbent, and the product recovery decreased to 84 Mol %.

It is claimed:

1. A method for removing an acid gas from a feed gas stream that includes the acid gas, a methane and an ethane, comprising:
    alternating an input of the feed gas stream between at least two beds of adsorbent particles made from a homogeneous mixture, wherein the adsorbent particles comprise a zeolite SSZ-98 or a zeolite SSZ-105 and are not coated or made from layers;
    wherein the feed gas stream contacts one of the at least two beds at a given time by an adsorption step and a tail gas stream is simultaneously vented from another of the at least two beds by a desorption step;
    wherein a contacting in the one of the at least two beds occurs at a feed pressure of from 345 kPa to 6895 kPa for a sufficient time to preferentially adsorb the acid gas from the feed gas stream and thereby producing a product gas stream containing no greater than 2 Mol % carbon dioxide, at least 65 Mol % of the methane recovered from the feed gas stream, and at least 25 Mol % of the ethane recovered from the feed gas stream; and wherein the feed gas stream is input at a feed end of each of the at least two beds, the product gas stream is removed from a product end of each of the at least two beds, and the tail gas stream is vented from the feed end of the at least two beds.

2. The method of claim 1, wherein the at least two beds of the adsorbent particles are four beds of the adsorbent particles and the product gas stream contains at least 80 Mol % of the methane recovered from the feed gas stream and at least 40 Mol % of the ethane recovered from the feed gas stream.

3. The method of claim 1, wherein the feed gas stream comprises the carbon dioxide and from 0 to 1000 wppm hydrogen sulfide.

4. The method of claim 1, wherein the zeolite SSZ-98 or the zeolite SSZ-105 has a Si:Al mole ratio of from 5 to 100.

5. The method of claim 1, wherein the feed gas stream has a flow rate of from 1 to 100 MMSCFD (1,095 to 109,522 $Nm^3$/hr) during the adsorption and the adsorption occurs at an adsorption-temperature from 20° C. to 80° C.

6. The method of claim 1, wherein the product gas stream comprises at least 95 Mol % total-methane and at least 3 Mol % total-ethane.

7. The method of claim 1, wherein the product gas stream contains no greater than 50 wppm hydrogen sulfide.

8. The method of claim 1, wherein the product gas stream contains no greater than 4 wppm hydrogen sulfide.

9. The method of claim 1, wherein the zeolite SSZ-98 or the SSZ-105 has a cation as a framework ion and the cation is selected from the group consisting of a sodium, a calcium, a potassium, a lithium, a magnesium, a barium, and combinations thereof.

10. The method of claim 9, wherein the cation is the sodium.

11. The method of claim 1, wherein the acid gas is selected from the group consisting of the carbon dioxide, a hydrogen sulfide, a carbonyl sulfide, and combinations thereof.

12. The method of claim 1, wherein the feed gas stream additionally comprises a water.

13. The method of claim 12, wherein the water in the feed gas stream is adsorbed by the at least two beds of the adsorbent particles and a $CO_2$ adsorption capacity of the adsorbent particles is lowered by less than 30 Mol %.

14. The method of claim 1, wherein the method utilizes two beds of the adsorbent particles, and further comprising:
  a. following the adsorption step in one of the two beds and a simultaneous desorption step in the other of the two beds, equalizing a pressure of the one of the two beds and the other of the two beds through the product end of each of the one of the two beds and the other of the two beds at an end of the adsorption and the simultaneous desorption step; and
  b. re-pressurizing the other of the two beds having just completed the simultaneous desorption step by sending a slipstream of the product gas stream through the product end of the other of the two beds having just completed the simultaneous desorption step.

15. The method of claim 1, wherein the at least two beds of the adsorbent particles are four beds; further comprising:
  a. following a first adsorption step in a first bed of the four beds, a first equalization step occurs wherein the first bed is allowed to pressure equalize with a second bed of the four beds having a lower-pressure than the first bed through a first line connecting the product end of the first bed and the product end of the second bed;
  b. following the first equalization step, lowering the feed pressure in the first bed and passing a gas from the first bed to a third bed of the four beds through a second line connecting the product end of the first bed and the product end of the third bed in a providing purge step such that the third bed of the four beds is purged;
  c. following the providing purge step, a second equalization step occurs wherein the first bed is allowed to pressure equalize with the third bed of the four beds having the lower-pressure than the first bed through a third line connecting the product end of the first bed and the product end of the third bed;
  d. following the second equalization step, depressurizing a first adsorbent bed to the feed pressure from about 6.89 kPa to about 138 kPa through the feed end of the first adsorbent bed in a blowdown step comprising either:
    i) allowing the gas in the first adsorbent bed to vent to a purge tank; or
    ii) using a vacuum pump to lower the feed pressure of the first adsorbent bed;
  e. following the blowdown step, the first bed is purged in a purging step wherein the gas is provided to the first bed through the product end of the first bed from a fourth bed of the four beds while the first bed is at the feed pressure from about 6.89 kPa to about 138 kPa and the gas is purged through the feed end of the first bed;
  f. following the purging step, a third equalization step occurs wherein the first bed is allowed to pressure equalize with the fourth bed having a higher-pressure than the first bed through a fourth line connecting the product end of the first bed and the product end of the fourth bed;
  g. following the third equalization step, a fourth equalization step occurs wherein the first bed is allowed to equalize with the second bed having the higher-pressure than the first bed through a fifth line connecting the product end of the first bed and the product end of the second bed;
  h. following the fourth equalization step, passing a slipstream of a product-gas or a stream of a storage gas from a storage tank through the product end of the first bed to repressurize the first bed to an adsorption-step-pressure in a repressurization step; and
  i. following the repressurization step, operating the first bed in an independent adsorption step for a sufficient period of time for the third bed and the fourth bed to be pressure equalized and the second bed to be depressurized prior to beginning a second adsorption step;

wherein the second bed, the third bed, and the fourth bed are sequenced to cycle through the first adsorption step, the first equalization step, the providing purge step, the second equalization step, the blowdown step, the purging step, the third equalization step, the fourth equalization step and the independent adsorption step in the same order as the first bed.

16. The method of claim 15, wherein the first adsorption step, the first equalization step, the providing purge step, the second equalization step, the blowdown step, the purging step, the third equalization step, the fourth equalization step and the independent adsorption step occur in a total cycle time of from 400 to 3600 seconds.

17. The method of claim 1, wherein the method is performed on an offshore platform.

18. The method of claim 1, wherein the method has a specific vacuum power consumption of from 0 to 1500 kWh/MMSCF (0 to 0.0571 kWh/Nm$^3$) of the feed gas stream.

19. The method of claim 1, wherein from greater than 0 wt % to 50 wt % of the tail gas stream is recycled to the feed gas stream; thereby producing the product gas stream containing not greater than 2 Mol % of the carbon dioxide, at least 90 Mol % of the methane in the feed gas stream, and at least 85 Mol % of total hydrocarbons in the feed gas stream.

20. A method for removing an acid gas from a feed gas stream, wherein the feed gas stream includes a methane, an ethane, a carbon dioxide, and from 4 to 1000 wppm hydrogen sulfide, comprising:
   alternating an input of the feed gas stream between an at least two beds of adsorbent particles made from a homogeneous mixture, wherein the one or more adsorbent particles comprise a zeolite SSZ-98 or a zeolite SSZ-105 and are not coated or made from layers;
   wherein the feed gas stream contacts one of the at least two beds at a given time in an adsorption step and a tail gas stream is simultaneously vented from another of the at least two beds in a desorption step;
   wherein a contacting in the one of the at least two beds occurs at a feed pressure of from 345 kPa to 6895 kPa for a sufficient time to preferentially adsorb the acid gas from the feed gas stream; thereby producing a product gas stream containing no greater than 2 Mol % of the carbon dioxide, no greater than 1 wppm of a carbonyl sulfide, no greater than 1 wppm of the hydrogen sulfide, at least 65 Mol % of the methane recovered from the feed gas stream, and at least 25 Mol % of the ethane recovered from the feed gas stream; and
   wherein the feed gas stream is input at a feed end of each of the at least two beds, the product gas stream is removed from a product end of each of the at least two beds, and the tail gas stream is vented from the feed end of the at least two beds.

21. A process for removing an acid gas from a feed gas stream, comprising: increasing a selectivity of an adsorbent for retaining an ethane or a propane in a product gas stream by increasing a substitution of an ERI phase with a LEV phase in a molecular sieve having an intergrowth of the ERI phase and the LEV phase; and contacting the adsorbent that comprises the molecular sieve with the feed gas stream in a pressure swing adsorption system.

22. The process of claim 21, wherein the increasing the substitution provides from 35% to 99% of the LEV phase in the molecular sieve, such that the increasing the substitution provides a higher kinetic selectivity for retaining the ethane or the propane in the product gas stream.

23. The process of claim 21, wherein the increasing of the substitution reduces an equilibrium adsorption of a carbon dioxide in the feed gas stream by zero to 1.0 mol/kg in a gas adsorption test.

24. A process for removing an acid gas from a feed gas stream, comprising:
   contacting, in a pressure swing adsorption system, a feed gas stream with adsorbent particles comprising a molecular sieve having an intergrowth of an ERI phase and a LEV phase to provide a product gas stream with less than 2 Mol % $CO_2$, from 80 to 99 Mol % of a methane recovered from the feed gas stream, from 40 to 99 Mol % of an ethane recovered from the feed gas stream, and from 60 to 100 Mol % of a propane recovered from the feed gas stream; wherein the LEV phase is from 31 to 99% in the molecular sieve.

25. The process of claim 24, wherein the molecular sieve has a first calculated diffusion coefficient for a $C_2H_6$ uptake from 3E-04 s$^{-1}$ to 1E-06 s$^{-1}$.

26. The process of claim 24, wherein the molecular sieve has a second calculated diffusion coefficient for a $C_3H_8$ uptake from 3E-06 s$^{-1}$ to 1E-07 s$^{-1}$.

27. The process of claim 24, wherein the molecular sieve has a cation as a framework ion and the cation is selected from the group consisting of a sodium, a calcium, a potassium, a lithium, a magnesium, a barium, and combinations thereof.

* * * * *